(12) United States Patent
Suzuki et al.

(10) Patent No.: US 6,781,729 B2
(45) Date of Patent: Aug. 24, 2004

(54) OPTICAL SCANNING SYSTEM WITH UNVARYING IMAGE SURFACE UNDER ENVIRONMENTAL TEMPERATURE CHANGE

(75) Inventors: Seizo Suzuki, Tokyo (JP); Hiromichi Atsuumi, Tokyo (JP); Kohji Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 32 days.

(21) Appl. No.: 10/207,241

(22) Filed: Jul. 30, 2002

(65) Prior Publication Data

US 2003/0128413 A1 Jul. 10, 2003

(30) Foreign Application Priority Data

Jul. 30, 2001 (JP) ........................................ 2001-229213

(51) Int. Cl.[7] .............................................. G02B 26/08
(52) U.S. Cl. ...................... 359/205; 359/207; 359/216; 359/900; 347/259
(58) Field of Search ................................ 359/204–226, 359/662, 900; 347/233, 241–244, 256–261

(56) References Cited

U.S. PATENT DOCUMENTS

| | | | |
|---|---|---|---|
| 5,999,345 A | 12/1999 | Nakajima et al. | |
| 6,166,842 A | 12/2000 | Aoki et al. | |
| 6,233,081 B1 | 5/2001 | Suzuki et al. | |
| 6,256,133 B1 | 7/2001 | Suzuki et al. | |
| 6,288,819 B1 | 9/2001 | Aoki et al. | |
| 6,369,927 B2 * | 4/2002 | Hayashi ...................... | 359/196 |
| 6,376,837 B1 | 4/2002 | Itabashi et al. | |
| 6,381,057 B1 | 4/2002 | Itabashi | |
| 6,388,792 B1 | 5/2002 | Atsuumi et al. | |
| 6,400,391 B1 | 6/2002 | Suhara et al. | |
| 6,429,956 B2 | 8/2002 | Itabashi | |
| 6,469,772 B1 | 10/2002 | Itabashi | |
| 6,498,617 B1 | 12/2002 | Ishida et al. | |
| 6,509,995 B1 * | 1/2003 | Suzuki et al. ................ | 359/196 |

FOREIGN PATENT DOCUMENTS

| | | |
|---|---|---|
| JP | 8-292388 | 11/1996 |
| JP | 2736984 | 1/1998 |
| JP | 2804647 | 7/1998 |

OTHER PUBLICATIONS

Pub. No.: US 2002/0101642; Appl. No.: 10/058,446; Filed: Jan. 28, 2002; Inventor: Masuda.

* cited by examiner

Primary Examiner—James Phan
(74) Attorney, Agent, or Firm—Oblon, Spivak, McClelland, Maier & Neustadt, P.C.

(57) ABSTRACT

An optical scanning device employing a scanning imaging optical system that includes a first optical system configured to receive a light flux emitted from a light source, and a second optical system configured to condense the light flux to form a long linear image in a main scanning direction in a vicinity of a deflecting surface of an optical deflector. Also includes is a third optical system configured to condense a light flux deflected by the optical deflector toward a scanned surface to form an optical beam spot on the scanned surface so that a maximum value $\Delta M_{max}$ and a minimum value $\Delta M_{min}$ of an amount of change $\Delta M$ in an image-surface curvature in the main scanning direction at each image height in an effective writing region with respect to a change $\Delta T$ in an environmental temperature satisfy a condition of $|(\Delta M_{max}-\Delta M_{min})/\Delta T|<0.01$ (mm/° C.).

42 Claims, 7 Drawing Sheets

PV: 0.031 λ
Rms: 0.007 λ

OPTICAL SCANNING SYSTEM WITH UNVARYING IMAGE SURFACE UNDER ENVIRONMENTAL TEMPERATURE CHANGE

BACKGROUND OF THE INVENTION

1. Field of the Invention

The present invention relates to a method and device for forming an image, and more particularly to a method and device that can effectively reduce and correct a change/variation in an image surface caused by an environmental temperature change.

2. Discussion of the Background

An optical scanning device is commonly known in relation to an image forming apparatus such as a digital copier, a laser printer, a facsimile, an optical plate-maker, an optical plotter, and other similar devices. It has become common to use a resin lens in a scanning imaging optical system because of cost and easiness of forming a lens surface into a special shape.

A variance of a radius of curvature and refractive index of a resin lens caused by a change in an environmental temperature is large as compared to a corresponding variance of a glass lens. Thus, if the environmental temperature changes, an image surface of an optical beam spot is shifted away from a scanned surface. Hence, a size of a diameter of the optical beam spot is increased, resulting in a degradation of a produced image due to a lowered resolution.

Recently, a multi-beam system was employed in the optical scanning device to increase the efficiency of a scanning operation. If a change in the image-surface position of the optical beam spot occurs in the multi-beam optical scanning device, a distance between scanning lines of optical beam spots adjacent to each other in a main scanning direction (i.e., a scanning pitch) differs from a standard predetermined distance. Thus, a degraded image is formed due to an increased optical beam spot diameter.

Therefore, if a resin optical element is employed in the optical scanning system and a good image quality is desired, then a change in an optical property of the resin optical element due to the change in the environmental temperature needs to be corrected. A method to perform the above correction is disclosed in Japanese Patent Laid-Open Publication No. 8-292388, Japanese Patent No. 2804647, and Japanese Patent No. 2736984.

In the method disclosed in the above background art, a shift of an image-surface position in an optical axis direction caused by the change in the environmental temperature is corrected. However, if an image-surface curvature occurs, an appropriate correction is not made.

In FIG. 5A, I and SF denote an image surface and a scanned surface, respectively. In more detail, the image surface corresponds to a space location where the optical light coming from the optical scanning system is designed to be focused and create a clear image while the scanned surface is defined as a physical surface of a photosensitive member. For a high quality image device, the image surface and the scanned surface must coincide. In the present invention, I is the image surface in the main scanning direction and SF is the scanned surface. For simplification, the image-surface curvature in the main scanning direction is ideally corrected in FIG. 5A. Thus, the image surface I in the main scanning direction matches the scanned surface SF.

In FIG. 5B, a position of the image surface I is changed due to the change in the environmental temperature and separated from the scanned surface SF. The position of the image surface I is shifted to a position that is parallel to the scanned surface SF. However, a shape of the image surface I is not deformed.

As illustrated in FIG. 5B, if the optical property of the optical element has been changed due to the temperature change, a light flux forms the image at position I and then becomes a diverging light flux that reaches the scanned surface SF and forms an optical beam spot thereon. FIG. 5C is a drawing illustrating an enlarged view of FIG. 5B. The light flux that forms the optical beam spot forms a beam waist in a vicinity of a geometric optical image forming point (i.e., an intersection of rays of light indicated by a solid line in FIG. 5C). A diameter of the beam spot in the vicinity of the beam waist changes as indicated by a dotted line in FIG. 5C. A high quantity image is obtained when a position of the beam waist matches the scanned surface SF. Thus, a designed diameter of the optical beam spot in the main scanning direction corresponds to the diameter of the beam waist d.

However, as illustrated in FIG. 5C, if the position of the image surface I is shifted relative to the scanned surface SF because the optical property of the optical system has changed due to the change in temperature, a diameter D of the optical beam spot formed on the scanned surface SF in the main scanning direction becomes larger than the designed diameter d of the optical beam spot, which is referred to as an increased beam diameter phenomenon. In FIG. 5C, the light flux is strongly converged in the main scanning direction to make the diameter of the optical beam spot small in the main scanning direction.

To the contrary, the diameter D of the optical beam spot in the main scanning direction is comparatively small in FIG. 5D. Thus, the light flux is not strongly converged in the main scanning direction. In this case, a size of the diameter D of the optical beam spot formed on the scanned surface SF does not largely differ from that of the designed diameter d of the optical beam spot.

In a relationship between the diameters D and d, a range in which an increased beam diameter will not cause a serious problem in the quality of the produced image is referred to D<d+Δd, where Δd is the range in which the increased beam diameter does not degrade the quality of the image. A range of a distance on both sides of the beam waist position that satisfies the expression D<d+Δd is referred to as ΔL. The ΔL is then referred to as a depth allowance. If a distance between the image surface I and the scanned surface SF is within the range ΔL, the increased beam diameter phenomenon, which may have an adverse effect on the quality of the produced image, does not occur.

FIGS. 5C and 5D show that the depth allowance depends on a degree of convergence of the light flux. Because the light flux that forms the optical beam spot is strongly converged as the size of the diameter of the optical beam spot decreases, the range ΔL becomes small, resulting in a narrow depth allowance.

If the position of the image surface I is shifted from the scanned surface SF and a shape of the image surface I does not substantially change from the shape thereof when the image surface I is not shifted as illustrated in FIG. 5B, a correction on the shift of the image surface I may not always be required when the diameter of the optical beam spot is relatively small because the shifted amount of the imaging surface I is maintained within the depth allowance as illustrated in FIG. 5D.

A method disclosed in the above-described background art is directed to perform a correction on the shift of the position of the image surface I when the shift does not involve the change in the shape of the imaging surface I. In other words, this method shifts the position of the imaging surface I on a certain linear direction but does not change the shape of the image surface I. If the image surface I was curved before the shifting, for example, the image surface I remains curved after the shifting and the curvature is not corrected.

When a resin imaging element is used, the shift of the position of the image surface I caused by the change in the environmental temperature involves also the change in the shape of the image surface I. FIG. 5E is a drawing in which the position of the image surface I is shifted from the scanned surface SF and the shape of the image surface I is deformed into an arc shape.

When the shape of the imaging surface I changes as illustrated in FIG. 5E, the diameter of the optical beam spot is increased so that it becomes larger in the central portion than in both ends portions, when a vertical direction in FIG. 5E represents the main scanning direction. In this instance, the change in the diameter of the optical beam spot involves a change in the image height and thereby a degradation of the image is noticeable.

When the position and shape of the image surface I change as illustrated in FIG. 5E, if a correction is made by the method disclosed in the above-described background art, the position of the image surface I is shifted as illustrated in FIG. 5F, for example. Thus, the diameter of the optical beam spot in the vicinity of an optical axis is adjusted to an appropriate size. However, the size of the diameter of the optical beam spot in both end portions of a writing region becomes large and the change in shape of the image surface I is not corrected, thus the quality of the image produced is degraded.

The shift of the position of the image surface in the main scanning direction was described above. The position of the image surface in the sub-scanning direction shifts in an identical manner. If a multi-beam scanning operation is performed when the temperature changes, then a change in the shape of the image surface is observed and the quality of a written image is noticeably degraded because the scanning pitch changes in addition to the change in the image height.

SUMMARY OF THE INVENTION

The present invention has been made in view of the above-mentioned and other problems and addresses the above-discussed and other problems.

The present invention advantageously provides a novel optical scanning device including a scanning imaging optical system using a resin optical element so that an occurrence of an image-surface curvature caused by a change in an environmental temperature is effectively reduced. The present invention further provides a novel optical scanning device employing a scanning imaging optical system using a resin imaging element wherein the occurrence of the image surface curvature and a shift of the image surface from a scanned surface caused by the change in an environmental temperature is effectively reduced and corrected, respectively.

According to an example of the present invention, a scanning imaging optical system includes a first optical system configured to receive a light flux emitted from a light source, a second optical system configured to receive the light flux from the first optical system and condense the light flux to form a long linear image in a main scanning direction in a vicinity of a deflecting surface of an optical deflector, and a third optical system configured to condense the light flux deflected by the optical deflector toward a scanned surface to form an optical beam spot on the scanned surface. The third optical system includes at least one resin imaging element so that a maximum value $\Delta M max$ and a minimum value $\Delta M min$ of an amount of change $\Delta M$ in an image-surface curvature in the main scanning direction at each image height in an effective writing region with respect to a change $\Delta T$ in an environmental temperature satisfy a condition: $|(\Delta M max - \Delta M min)/\Delta T| < 0.01$ (mm/° C.).

According to another example of the present invention, the third optical system includes at least one resin imaging element so that a maximum value $\Delta S max$ and a minimum value $\Delta S min$ of an amount of change $\Delta S$ in an image-surface curvature in a sub-scanning direction at each image height in an effective writing region with respect to a change $\Delta T$ in an environmental temperature satisfy a condition of: $|(\Delta S max - \Delta S min)/\Delta T| < 0.01$ (mm/° C.).

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
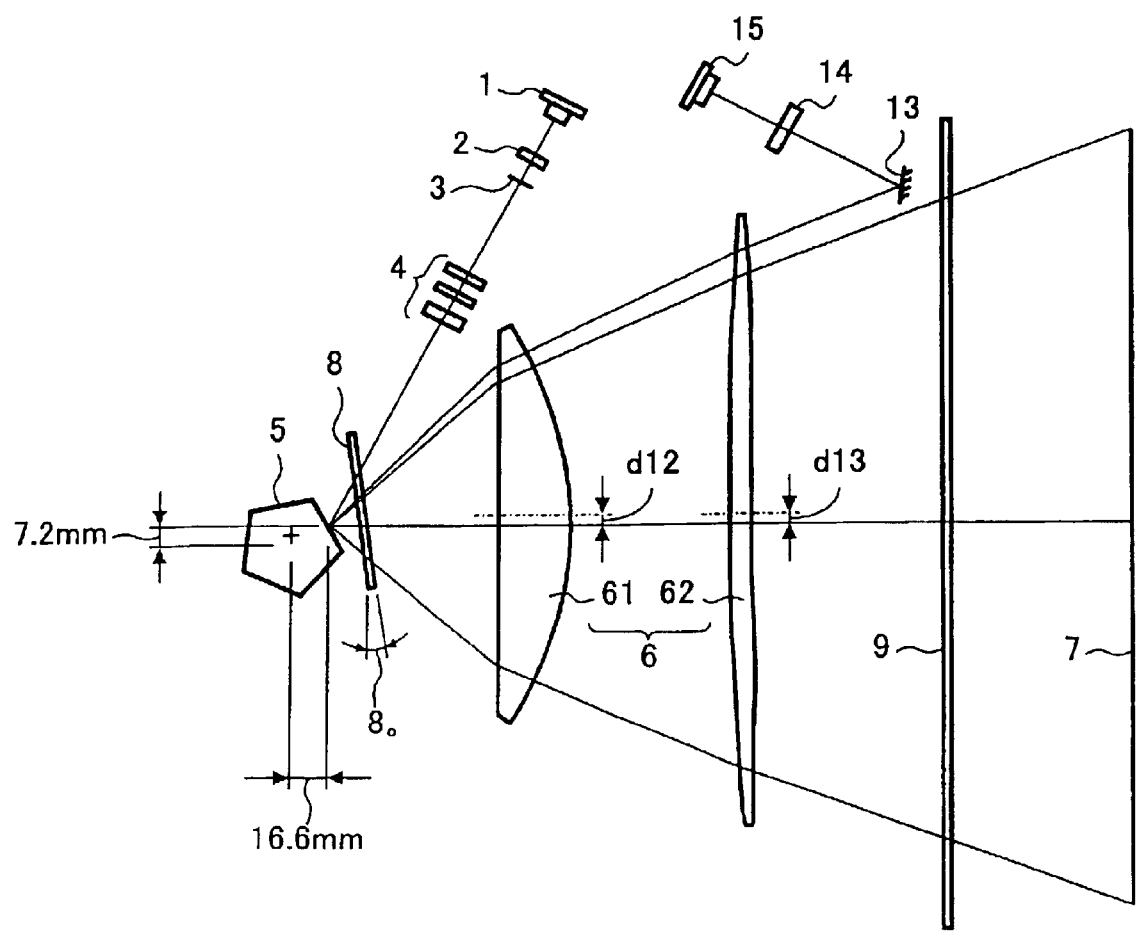
FIGS. 1A through 1D are drawings illustrating an optical arrangement of an optical scanning device according to an example of the present invention.

Referring now to the drawings, wherein like reference numerals designate identical or corresponding parts throughout the several views, FIGS. 1A-1D are drawings illustrating a construction of an optical scanning device according to an example of the present invention.

The optical scanning device is a multi-beam system optical scanning device. As illustrated in FIG. 1C, a light source 1 includes a 4-channel semiconductor laser array having 4 semiconductor laser channels CH1 through CH4 disposed in a straight line with an equal spacing therebetween.

Figure 1B:
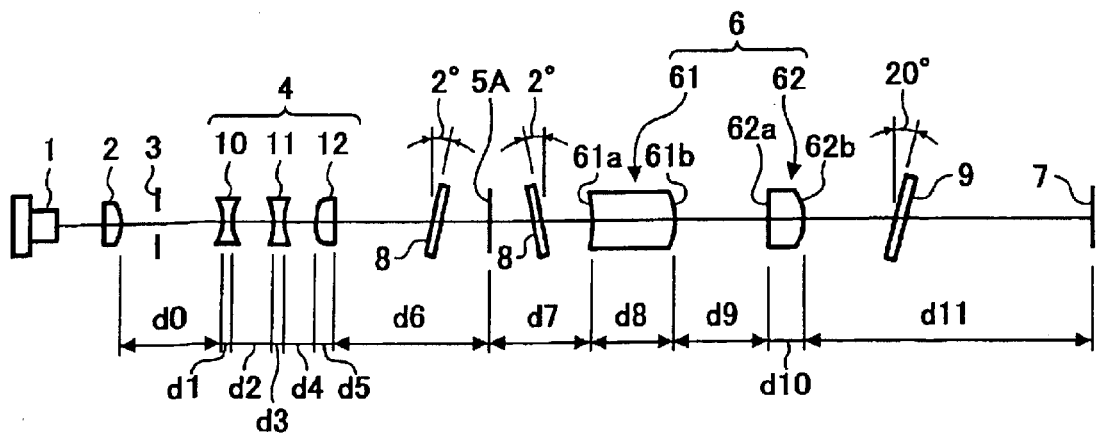
Figure 1C:
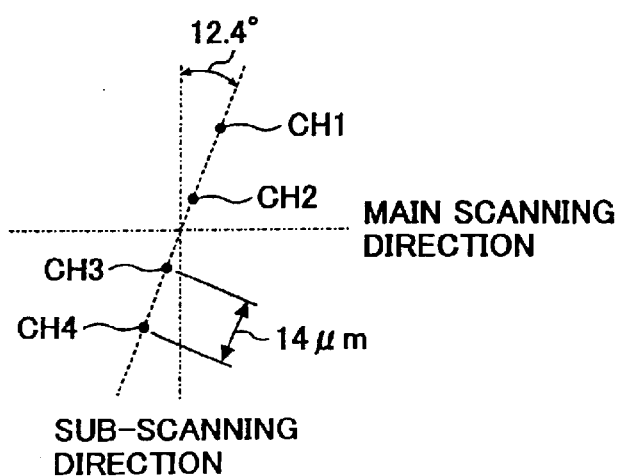

FIG. 1A is a drawing showing an optical configuration of the optical scanning device viewed from a sub-scanning direction (i.e., from a direction orthogonal to FIG. 1A), and FIG. 1B is a drawing showing an optical path viewed from a main scanning direction. The optical path is formed between the light source 1 and a scanned surface along an optical axis, where a single light flux is shown for simplicity.

A diverging light flux emitted by the light source 1 is converted to a desired type of light flux suitable for propagation to a following optical system by a coupling lens 2 (i.e., a first optical system). The suitable type of light flux includes a parallel light flux, a weak diverging light flux or a weak converging light flux. In the example described below, the light flux is coupled to a substantially parallel light flux.

The coupling lens 2 is formed of a single aspherical lens. A wavefront aberration of the coupled light flux is appropriately corrected by the coupling lens 2 alone. The light flux emerges from an opening of an aperture 3 and is shaped into a shape of the opening of the aperture when the light flux passes through the opening of the aperture. The light flux then reaches a second optical system 4.

The second optical system 4 includes three lenses 10, 11, and 12. The lenses 10 and 11 are formed of resin (i.e., a resin imaging element). The lens 12 is formed of glass (i.e., a glass imaging element).

The second optical system 4 condenses the light flux incident from a side of the first optical system 2 to form a long linear image in a main scanning direction in the vicinity of a deflecting surface 5A of a polygon mirror 5 that is an optical deflector. The light flux passes through a soundproof glass 8 of a casing that contains the polygon mirror 5. The soundproof glass 8 is tilted at a predetermined minute angle in the sub-scanning direction such that the light flux reflected from a surface of the soundproof glass 8 does not work as a ghost light.

The light flux reflected from the deflecting surface 5A of the polygon mirror 5 becomes a deflected light flux and the deflection is achieved by a rotation of the polygon mirror 5 at a constant angular speed. The deflected light flux passes through the soundproof glass 8 and reaches a third optical system 6. The third optical system 6 includes a fθ lens, and is formed of two lenses 61 and 62. In the below described example, the lenses 61 and 62 are formed of resin (i.e., the resin imaging element).

The deflected light flux passes through the third optical system 6 and then passes through a dustproof glass 9. The dustproof glass 9 is tilted at a predetermined angle in the sub-scanning direction to prevent the reflected light from becoming the ghost light. The third optical system 6 condenses the deflected light flux toward a scanned surface 7 to form an optical beam spot on the scanned surface 7. The scanned surface 7 is optically scanned by this optical beam spot at constant velocity in the main scanning direction.

According to the example of the present invention, the light source 1 includes a semiconductor laser array having four channels. Because four light fluxes are emitted, four optical beam spots are formed on the scanned surface 7. The four optical beam spots are separated one from the other in the sub-scanning direction. Thus, a multi-beam optical scanning is performed while four scanned lines are scanned at the same time in the main scanning direction.

The multi-beam system may be configured to be a line sequential scanning system in which adjacent optical spots scan scanned lines adjacent to each other in the sub-scanning direction. The multi-beam system may be configured to be an interlaced scanning system in which the adjacent optical spots scan the scanned lines in the main scanning direction having one or more scanned lines therebetween. The scanned surface is substantially a photosensitive surface of a photosensitive medium.

The light flux is deflected while being condensed by the third optical system 6. Thus, a part of the light flux is detected by a photodiode 15 through a reflecting mirror 13 and a synchronization lens 14 before an optical writing operation in an effective writing region is performed. Based on a signal emitted by the photodiode 15, a synchronizing signal for starting the writing operation is generated.

Figure 1D:
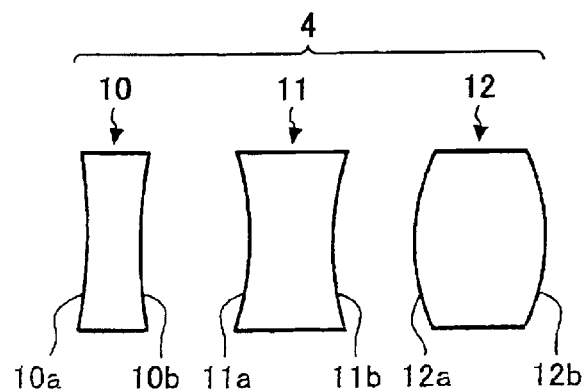

FIG. 1D is a drawing showing a shape of a surface of lenses 10, 11, and 12 in a sub-scanning cross section. The lenses 10, 11, and 12 form the second optical system 4. An incident surface 10a of the resin lens 10 is formed into a spherical shape (i.e., concave spherical surface) having a negative power. An emerging surface 10b of the lens 10 is formed into a cylindrical shape having a negative power only in the sub-scanning direction. Thus, the resin lens 10 has the negative power in both the main and sub-scanning directions. However, the negative power in the sub-scanning direction is larger than that in the main scanning direction.

A parallel light flux incident from the light source 1 side is caused to diverge by the resin lens 10 in both main and sub-scanning directions. The light flux then reaches the resin lens 11. The resin lens 11 has a negative power in the sub-scanning direction. The diverging tendency of the light flux that passed through the lens 10 is further strengthened in the sub-scanning direction while a level of the diverging tendency of the light flux is maintained in the main scanning direction. The light flux then reaches the glass lens 12. In the below described example, an emerging surface side 11b of the resin lens 11 has a non-arc shape in a sub-scanning cross section.

The glass lens 12 has a positive power in both the main and sub-scanning directions. The positive power in the sub-scanning direction is larger than the power in the main scanning direction. A diverging light flux incident from the resin lens 11 side is converted into a converging light flux in the sub-scanning direction by the strong positive power of the glass lens 12. The diverging light flux incident from the resin lens 11 side is converted into a parallel light flux in the main scanning direction by the positive power of the glass lens 12. Namely, the second optical system 4 serves as an optical system that converges a light flux in the sub-scanning direction, and serves as a beam expander in the main scanning direction.

Thus, the light flux passed through the glass lens 12 condenses and forms a long (expanded) linear image in the main scanning direction in the vicinity of the deflecting surface 5A of the polygon mirror 5, as described above.

In the example described below, an incident surface 12a of the glass lens 12 is formed into a convex cylindrical shape having the positive power in the sub-scanning direction. An emerging surface 12b of the glass lens 12 is formed into a convex spherical shape.

As described in the example of the present invention, the glass lens 12 is formed as a combination of a cylindrical surface and a spherical surface. However, the glass lens may be formed as a cylindrical lens and a spherical lens glued together. In addition, the glass lens 12 may be formed to have two cylindrical surfaces having a different power with respect to each other. A coupling state of the coupling lens 2 may be changed such that the light flux reaching the second optical system 4 becomes a weak converging light flux. Then, the glass lens 12 may be formed into a cylindrical lens having a positive power only in the sub-scanning direction.

In the example described below, lenses 61 and 62 included in the third optical system 6 are formed of resin. If the environmental temperature changes, the position of the image surface shifts and the shape of the image surface changes. Thus, a shape of the lenses 61 and 62 are determined to satisfy four conditions described below. The shift of the position of the image surface in the main scanning direction is corrected by a change in a power of the incident surface 10a of the resin lens 10 in the main scanning direction. The shift of the position of the image surface in the sub-scanning direction is corrected by a change in a power of the emerging surface 10b of the resin lens 10, and the incident surface 11a and the emerging surface 11b of the resin lens 11 in the sub-scanning direction.

Therefore, the present inventors have recognized that an excellent quality scanning imaging optical system can be achieved by using a plurality of optical systems including lenses so configured to change in an allowed range, between a maximum and a minimum value, the image-surface curvature change in the main scanning direction for each image height in the effective writing region with response to a change in the environmental temperature. In the following examples, a scanning imaging optical system is presented and the image surface curvature change in the main scanning direction, a focus change, and an image-surface curvature change in a sub-scanning direction each satisfy a certain condition so that the image surface and the scanned surface overlay almost identical in a predetermined temperature range. In other words, the scanning optical system with the plurality of optical systems complying with the conditions 1–4 as discovered and described below by the present inventors ensure a good quality of the image producing device.

AN EXAMPLE

An example of the optical scanning device presented in FIGS. 1A–1D is described below. A shape of a lens surface is expressed as follows.

If a lens has a non-arc shape surface in a main scanning cross section, and Rm represents a paraxial radius of curvature in the main scanning cross section, Y represents a distance from an optical axis in the main scanning direction, K represents a cone constant, $A_1$, $A_2$, $A_3$, $A_4$, $A_5$, $A_6$, ... represent a coefficient of higher degree, and X(Y) represents a depth in the optical axis direction, the shape of the lens surface is specified by a commonly known expression, namely, $$X(Y) = (Y^2/Rm)/[1+SQRT\{1-(1+K)(Y/Rm)^2\}] + A_1Y + A_2Y^2 + A_3Y^3 + A_4Y^4 + A_5Y^5 + A_6Y^6 + \ldots \quad (1A)$$

If one of the odd-numbered coefficients (i.e., $A_1$, $A_3$, $A_5$ ...) is non-zero, the non-arc shape of the lens surface in the main scanning cross section is asymmetric with respect to the optical axis. In the example of the present invention, because only even-numbered coefficients are selected, the non-arc shape of the lens surface in the main scanning cross section is symmetric with respect to the optical axis. A cross section in the sub-scanning direction (i.e., a virtual plane cross section orthogonal to the main scanning direction) is assumed to exist in an arbitrary coordinate Y in the main scanning direction.

If a curvature (i.e., reciprocal of paraxial radius of curvature) in the sub-scanning cross section varies according to a position of the coordinate Y in the main scanning direction like a toric lens, for example, a curvature C(Y) of a lens surface is indicated by the expressin (2A) described below. In this case, a radius of curvature of the lens surface including an optical axis in the sub-scanning cross section and a coefficient are represented by Rs(0), and $B_1$, $B_2$, $B_3$, $B_4$, ..., respectively, and the curvature C(Y) is given by:

$$Cs(Y) = \{1/Rs(0)\} + B_1Y + B_2Y^2 + B_3Y^3 + B_4Y^4 + B_5Y^5 \ldots \quad (2A).$$

If one of the odd-numbered coefficients of Y (i.e., $B_1$, $B_3$, $B_5$, ...) is non-zero, a variance of the curvature in the sub-scanning direction is asymmetric with respect to the optical axis in the main scanning direction. The non-arc lens surface in the sub-scanning cross section varies according to a position of the coordinate Y in the main scanning direction in the sub-scanning cross section. The non-arc lens surface is indicated by the expression (3A) described below. A depth in the optical axis direction is represented by X(Y, Z) as a function of the coordinate Y (in the main scanning direction) and a coordinate Z (in the sub-scanning direction) as follows:

$$\begin{aligned}X(Y,Z) =& \\ &\{Y^2/Rm\}/[1+SQRT\{1-(1+K)(Y/Rm)^2\}] + A_1Y + A_2Y^2 + \\ &A_3Y^3 + \ldots + Cs(Y)Z^2/[1+SQRT\{1-(1+Ks(Y))Cs(Y)^2Z^2\}] + \\ &(F_0 + F_1Y + F_2Y^2 + F_3Y^3 + F_4Y^4 + \ldots)Z + \\ &(G_0 + G_1Y + G_2Y^2 + G_3Y^3 + G_4Y^4 + \ldots)Z^2 + \\ &(H_0 + H_1Y + H_2Y^2 + H_3Y^3 + H_4Y^4 + \ldots)Z^3 + \\ &(I_0 + I_1Y + I_2Y^2 + I_3Y^3 + I_4Y^4 + \ldots)Z^4 + \\ &(J_0 + J_1Y + J_2Y^2 + J_3Y^3 + J_4Y^4 + \ldots)Z^5 + \\ &(K_0 + K_1Y + K_2Y^2 + K_3Y^3 + K_4Y^4 + \ldots)Z^6 + \\ &(L_0 + L_1Y + L_2Y^2 + L_3Y^3 + L_4Y^4 + \ldots)Z^7 + \\ &(M_0 + M_1Y + M_2Y^2 + M_3Y^3 + M_4Y^4 + \ldots)Z^8 + \\ &(N_0 + N_1Y + N_2Y^2 + N_3Y^3 + N_4Y^4 + \ldots)Z^9 + \ldots\end{aligned} \quad (3A)$$

The term Cs(Y) which appears in the third line of the expression (3A) is defined by the above-described expression (2A), Ks(Y) represents a cone constant of the shape of the lens surface in the sub-scanning cross section along the coordinate Y, and Ks(Y) is represented by the following expression as a function of Y, $$Ks(Y) = C_0 + C_1Y + C_2Y^2 + C_3Y^3 + C_4Y^4 + C^5Y^5 + \ldots \quad (4A),$$

where a first term $C_0$ in the right-hand side of the expression (4A) is Ks(0).

An amount of the non-arc in the sub-scanning cross section is asymmetrical with respect to the main scanning direction when $F_1$, $F_3$, $F_5$ ..., $G_1$, $G_3$, $G_5$, ... etc., are non-zero values in the expression (3A).

First and second lines of the right-hand side of the expression (3A) are functions only of the coordinate Y, and represent the shape of the lens in the main scanning cross section like the expression (1A). In a third line and thereafter in the right-hand side of the expression (3A), a coefficient of any term that depends on Z is determined based on a coefficient of Y, when the coordinate Y in the sub-scanning section is determined. Thus, the non-arc shape of the lens in the sub-scanning cross section in the coordinate Y is determined. An analysis of the non-arc lens surface in the sub-scanning cross section is expressed in various expressions without being limited to the above-described expression. Therefore, a shape of the non-arc lens surface in the sub-scanning cross section according to the example of the present invention is not limited to the shape that is obtained by the above-described expression.

A NUMERICAL EXAMPLE

A density of pixel: 1200 dpi.
An effective writing width: ±150 mm.
An angle of field: 137.7°.
(A Light Source Unit)
Light source: four-channel semiconductor laser array
Wavelength of an emitted light: 780 nm.
A channel pitch: 141 μm.
An angle of channels with respect to the sub-scanning direction: 12.4°.

Wavelength variation coefficient for a temperature change: $2.31 \times 10^{-5}$ (nm/° C.).

A linear expansion coefficient of a holding member (made of aluminum): $2.31 \times 10^{-5}$ (1/L° C.).

(Coupling Lens (i.e., First Optical System))

Glass non-spherical lens a focal length: 27 mm.

A coupling action: collimating action.

A wavefront aberration is effectively corrected.

(Aperture)

A diameter of an optical spot on an optical axis (i.e., image hight: 0): approximately 30 μm is targeted.

An opening: a rectangular-shaped opening having a size of 8.2 mm and 1.6 mm in the main and sub-scanning direction, respectively.

A distance from the coupling lens: 4.5 mm.

(Polygon Mirror)

The number of a deflecting surface: 5.

A radius of an inscribed circle: 18 mm.

An angle formed between a light flux incident from a light source side and an optical axis of a f θ lens: 60°.

A distance between a starting point of deflection of the deflecting surface and a rotating shaft: 16.6 mm in an optical axis direction of the fθ lens and 7.2 mm in the main scanning direction.

(A Soundproof Glass for a Polygon Scanner)

A floating glass thickness: 1.9 mm.

A tilting angel with respect to the sub-scanning direction: 2°.

A tilting angle with respect to the main scanning angle: 8°.

(A Dustproof Glass)

A floating glass thickness: 1.9 mm.

A tilting angel with respect to the sub-scanning corss section: 20°.

(Synchronization Optical System)

A photodiode for detecting synchronization is provided at an imaging position next to a scanned surface. A synchronization lens includes a cylindrical lens having a curvature in the sub-scanning direction. All resin lenses used in the optical system described below are formed of polyolefin resin.

(An Optical Arrangement Between the Coupling Lens and the Polygon Mirror)

As shown in FIG. 1B, a width of each lens and distance between each lens provided between the coupling lens 2 and the deflecting surface 5A is referred to d0 through d6. Data on d0 through d6 is then described below.

d0=47 mm, d1=3 mm, d2=9.2 mm, d3=3 mm, d4=8.15 mm, d5=6 mm, and d6=114 mm.

The lenses 10 and 11 are formed of resin. The lens 12 is formed of glass.

(A Radius of Curvature of Surfaces 10a to 12b of Each Lens in the Second Optical System 4 is Described in an Example Below)

A radius of curvature of lens surface 10a: −119.97 mm.

A radius of curvature of lens surface 10b: ∞ in the main scanning direction, 16.4 mm in the sub-scanning direction.

A radius of curvature of lens surface 11a: ∞ in the main scanning direction, −16 mm in the sub-scanning direction.

A radius of curvature of lens surface 11b: 1.0 E+8 mm in the main scanning direction, 18.03 mm in the sub-scanning direction.

A radius of curvature of lens surface 12a: ∞ in the main scanning direction, 13.54 mm in the sub-scanning direction.

A radius of curvature of lens surface 12b: −186 mm.

In the above description, for example, 1.0 E+8 indicates $1.0 \times 10^8$. This notation is used through the present description.

A shape of each lens surface is described next. In more detail, the surface 10a is a spherical surface having a concave shape, the surfaces 10b and 11a are cylindrical surfaces having a concave shape, the surface 12a is cylindrical surface having a convex shape, the surface 12b is a spherical surface having a convex shape, and the surface 11b (i.e., emerging surface of the resin lens 11) is a non-arc surface in the sub-scanning cross section.

Data on the shape of the lens surface 11b (i.e., non-arc lens surface in the sub-scanning cross section) is as follows:

Rm=1.00+08,

Rs=18.03, $A_4$=1.287048 E−07, $A_6$=1.615827 E−09, $C_0$=3.681387 E+01, $C_2$=1.882281 E−01, $C_4$=1.542188 E−02, $C_6$=−4.096661 E−04, $C_8$=5.584789 E−06, $I_0$=3.496085 E−04, $I_2$=−2.319818 E−06, $I_4$=−7.859564 E−08, $I_6$=7.462640 E−10, $I_8$=−2.952126 E−11, $K_0$=6.055635 E−06, $K_2$=−1.070845 E−06, $K_4$=−1.078958 E−07, $K_6$=2.023609 E−09, and $K_8$=−2.307748 E−11.

A refractive index of the resin lenses 10 and 11 is 1.523978 (λ=780 nm at 25° C.).

A linear expansion coefficient of the resin lenses 10 and 11 is $7 \times 10^{-5}$ (1/L° C.).

A coefficient of the refractive index of the resin lenses 10 and 11 is $-8.9 \times 10^{-5}$ (1/° C.).

A refractive index of the glass lens 12 is 1.733278 (λ=780 nm at 25° C.).

A linear expansion coefficient of the glass lens 12 is $5.4 \times 10^{-6}$ (1/L° C.).

A coefficient of the refractive index of the glass lens 12 is $6.4 \times 10^{-6}$ (1/° C.).

A linear expansion coefficient of a lens holding portion (made of aluminum) is $2.31 \times 10^{-5}$ (1/L° C.).

(An Optical Arrangement Between the Polygon Mirror 5 and Scanned Surface 7).

As illustrated in FIG. 1B, a width of each lens and a distance between each pair of lenses provided between the deflecting surface 5A and the scanned surface 7 is referred to d7 through d11. A shift amount of lenses 61 and 62 in the main scanning direction is referred to as d12 and d13, respectively, as illustrated in FIG. 1A. The shift amount in the upper direction in FIG. 1A is referred to as a positive shift amount. Numerical values of the distances d7 through d13 are described below:

$d_7 = 71.6$ mm,
$d_8 = 30$ mm,
$d_9 = 66.3$ mm,
$d_{10} = 8.5$ mm,
$d_{11} = 159.3$ mm,
$d_{12} = 0.2$ mm, and
$d_{13} = 0.2$ mm.

A refractive index of the resin lenses 61 and 62 is 1.523978 ($\lambda = 780$ nm, at 25° C.).

A linear expansion coefficient of the resin lenses 61 and 62 is $7 \times 10^{-5}$ (1/L° C.).

A coefficient of the refractive index of the resin lenses 61 and 62 is $-8.9 \times 10^{-5}$ (1/° C.).

(Data on a Lens Surface 61a is Described Below).

The lens surface 61a has a non-arc shape, which is symmetric with respect to the optical axis, in the main scanning cross section. A curvature of the lens surface 61a in the sub-scanning cross section asymmetrically changes with respect to the optical axis in the main scanning direction.

Data on the shape of the lens surface 61a is described below:

$Rm = -1030.233$,
$Rs = -89.519$,
$A_0 = -4.041619$ E+02,
$A_4 = 6.005017$ E−08,
$A_6 = -7.538155$ E−13,
$A_8 = -4.036824$ E−16,
$A_{10} = 4.592164$ E−20,
$A_{12} = -2.396524$ E−24,
$B_1 = -9.317851$ E−06,
$B_2 = 3.269905$ E−06,
$B_3 = 4.132497$ E−09,
$B_4 = -4.207716$ E−10,
$B_5 = -1.170114$ E−12,
$B_6 = 4.370640$ E−14,
$B_7 = 2.347965$ E−16,
$B_8 = -6.212795$ E−18,
$B_9 = -3.967994$ E−20,
$B_{10} = -3.873869$ E−21,
$B_{11} = 3.816823$ E−24, and
$B_{12} = 4.535843$ E−25.

The lens surface 61b has a non-arc shape, which is symmetric with respect to the optical axis, in the main scanning cross section. A curvature of the lens surface 61b in the sub-scanning cross section symmetrically changes with respect to the optical axis in the main scanning direction. Data on the shape of the lens surface 61b is described below:

$Rm = -109.082$,
$Rs = -110.881$,
$A_0 = -5.427642$ E−01,
$A_4 = 9.539024$ E−08,
$A_6 = 4.882194$ E−13,
$A_8 = -1.198993$ E−16,
$A_{10} = 5.029989$ E−20,
$A_{12} = -5.654269$ E−24,
$B_2 = -3.652575$ E−07,
$B_4 = 2.336762$ E−11,
$B_6 = 8.426224$ E−14,
$B_8 = -1.026127$ E−17,
$B_{10} = -2.202344$ E−21, and
$B_{12} = 1.224555$ E−26.

The lens surface 62a has a non-arc shape, which is symmetric with respect to the optical axis, in the main scanning cross section. A curvature of the lens surface 62a in the sub-scanning cross section symmetrically changes with respect to the optical axis in the main scanning direction. Data on the shape of the lens surface 62a is described below:

$Rm = 1493.655$,
$Rs = -70.072$,
$A_0 = 5.479389$ E+01,
$A_4 = -7.606757$ E−09,
$A_6 = -6.311203$ E−13,
$A_8 = 6.133813$ E−17,
$A_{10} = -1.482144$ E−21,
$A_{12} = 2.429275$ E−26,
$A_{14} = -1.688771$ E−30,
$B_2 = -8.701573$ E−08,
$B_4 = 2.829315$ E−11,
$B_6 = -1.930080$ E−15,
$B_8 = 2.766862$ E−20,
$B_{10} = 2.176995$ E−24, and
$B_{12} = -6.107799$ E−29.

Data on the shape of the lens surface 62b (i.e., non-arc shape in the sub-scanning direction) is described below:

$Rm = 1748.584$,
$Rs = -28.035$,
$A_0 = -5.488740$ E+02,
$A_4 = -4.978348$ E−08,
$A_6 = 2.325104$ E−12,
$A_8 = -7.619465$ E−17,
$A_{10} = 3.322730$ E−21,
$A_{12} = -3.571328$ E−26,
$A_{14} = -2.198782$ E−30,
$B_1 = -10.440188$ E−06,
$B_2 = 4.696142$ E−07,
$B_3 = 1.853999$ E−11,
$B_4 = -4.153092$ E−11,
$B_5 = -8.494278$ E−16,
$B_6 = 2.193172$ E−15,
$B_7 = 9.003631$ E−19,
$B_8 = -9.271637$ E−21,
$B_9 = -1.328111$ E−22,
$B_{10} = -1.409647$ E−24,
$B_{11} = 5.520183$ E−27,
$B_{12} = 4.513104$ E−30,
$C_0 = -9.999999$ E−01,
$I_0 = -1.320849$ E−07.
$I_2 = -1.087674$ E−11,
$I_4 = -9.022577$ E−16,
$I_6 = -7.344134$ E−20,
$K_0 = 9.396622$ E−09,
$K_2 = 1.148840$ E−12,
$K_4 = 8.063518$ E−17, and
$K_6 = -1.473844$ E−20.

Based on the above-described data, the shape of each lens in the optical scanning device is specified.

Figure 2A:
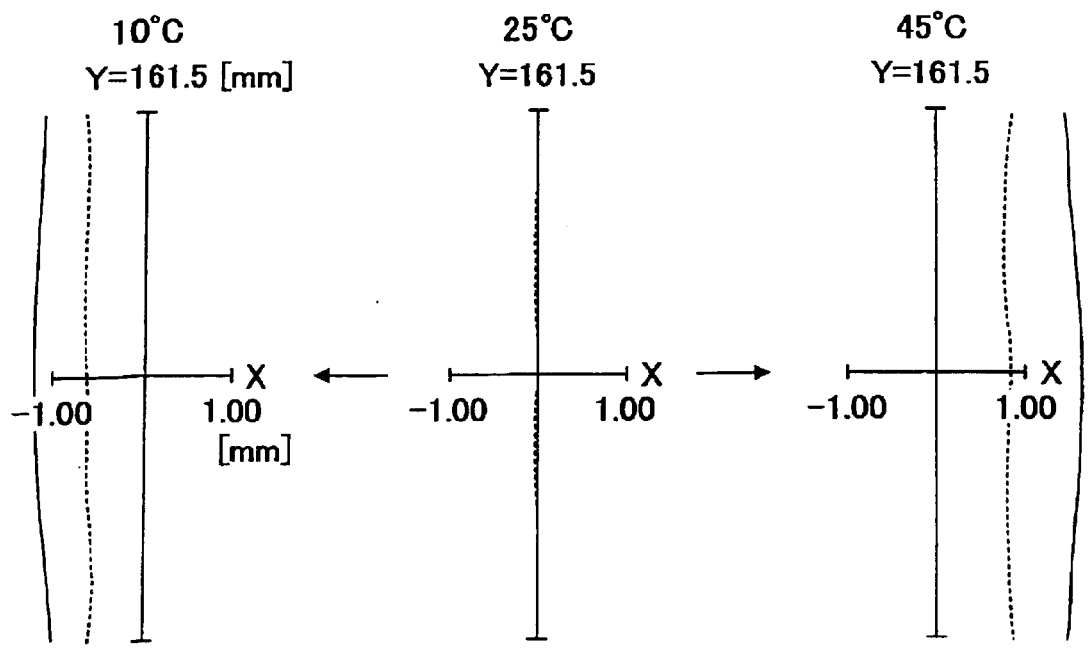
FIGS. 2A and 2B are drawings illustrating a change in an image surface of an optical beam spot.

A change in the image surface due to an environmental temperature of 25° C. is illustrated in the central portion of FIG. 2A. In FIG. 2A, a dotted line and a solid line represent the image surface in the main and sub-scanning directions, respectively. The change in the image surface at the environmental temperature of 25° C. is appropriately corrected so that the image surface of the optical beam spot in both the main and sub-scanning directions substantially matches the scanned surface.

A First Example

In the first example of the present invention, a cylindrical glass lens having a focal length of 45 mm (which is equivalent to the above-described numerical example) is employed. The image surface at the environmental temperature of 25° C. is identical to that illustrated at the center of FIG. 2A. However, the image surface changes as illustrated at the left and right end portions of FIG. 2A at the environmental temperatures of 10° C. and 45° C., respectively. The position and shape of the image-surface of the optical beam spot change in both the main and sub-scanning directions because of a change in an optical property of the resin lenses 61 and 62 (that form the third optical system 6) due to the change in the environmental temperature.

The change in the image surface of the optical beam spot includes a biasing component and a change in the shape of the image surface (i.e., an image-surface curvature). A shift of the position of the image surface of the optical beam spot to a position parallel to itself is referred to as the biasing component of the change in the image surface. For example, at the environmental temperature of 45° C., the position of the image surface for an image height of 0 mm shifts by approximately 1 mm and 1.5 mm in the main and sub-scanning directions, respectively.

An image-surface curvature is evaluated as described below using a parameter of the condition described above. An amount of change (unit in mm) in the image-surface curvature at each image height (e.g., typically the image height of 0 mm, ±40 mm, ±80 mm, ±120 mm, and ±150 mm) in the main scanning direction at the environmental temperatures of 10° C. and 45° C. is obtained as described below:

The temperature change $\Delta T$ represents a range of the change in the environmental temperature at which the first, second and third optical systems 2, 4, 6 are used. The scanning imaging optical system is generally designed to work at an average environmental temperature of around 25° C. However, it is assumed that the environmental temperature may change in a range of approximately 10° C. to approximately 45° C., for example. Based on this assumption, the value of $\Delta T$ is 35° C., namely 45° C.–10° C.=35° C.

Upper and lower limits of the environmental temperature change are referred to as TU and TL, respectively. A base of the environmental temperature on which the scanning imaging optical system is designed to work is referred to as TC. The image height of the optical beam spot (i.e., a position of the optical beam spot in the main scanning direction) and an amount of the image-surface curvature in the main scanning direction are referred to as H and M respectively. Hence, the amount of the image-surface curvature M denotes a function of the image height H and the temperature T. In this instance, M(H, TC) represents the image-surface curvature in the main scanning direction at the designed environmental temperature, namely a designed image-surface curvature. Thus, at an arbitrary image height H in the effective writing region, the closer an absolute value of M(H, TC) to 0 (zero), the greater the degree of correction is performed on the image-surface curvature.

The amount of change in the image-surface curvature (i.e., $\Delta M$) at each image height in the main scanning direction with respect to the change in the environmental temperature (i.e., $\Delta T$) is calculated with an expression: M(H, TU)–M(H, TL). The amount of change $\Delta M$ is referred to as $\Delta M(H)$ because $\Delta M$ is a function of the image height H, and $\Delta Mmax$ and $\Delta Mmin$ represent a maximum value and a minimum value of $\Delta M(H)$, respectively.

The portion of the condition (1), namely, $|(\Delta Mmax-\Delta Mmin)|$, is an index representing the amount of change in the image-surface curvature with respect to the environmental temperature change $\Delta T$. Thus, the smaller this amount, the smaller the change in the shape/curvature of the image

| | Image height | | | | | | | | |
|---|---|---|---|---|---|---|---|---|---|
| | 150 | 120 | 80 | 40 | 0 | −40 | −80 | −120 | −150 |
| 10° C. | −0.066 | −0.013 | 0.017 | 0.023 | 0.024 | 0.023 | 0.017 | −0.012 | −0.063 |
| 45° C. | 0.054 | −0.012 | −0.051 | −0.061 | −0.062 | −0.060 | −0.052 | −0.014 | 0.050 |

$\Delta M$ is calculated as follows based on the above amounts and the values are:

| | Image height | | | | | | | | |
|---|---|---|---|---|---|---|---|---|---|
| | 150 | 120 | 80 | 40 | 0 | −40 | −80 | −120 | −150 |
| $\Delta M$ | 0.120 | 0.001 | −0.068 | −0.084 | −0.086 | −0.084 | −0.068 | −0.001 | 0.113. |

Because $\Delta Mmax=0.120$ (at image height 150 mm), $\Delta Mmin=-0.086$ (at image height 0 mm), and a temperature change $\Delta T=45-10=35°$ C., a value of a parameter of a condition (1), namely $|(\Delta Mmax-\Delta Mmin)/\Delta T|$, becomes 0.006 so to satisfy the condition (1), namely, $|(\Delta Mmax-\Delta Mmin)/\Delta T|<0.01$ [mm/° C.].

surface. The condition (1) shows that the degree of the change in the shape of the image surface per unit of the temperature change with respect to the environmental temperature change $\Delta T$ is smaller than 0.01 mm.

When the resin imaging element in the third optical system includes a lens, the condition (1) is satisfied even if the resin imaging optical system includes the single lens, if a shape of the incident and emerging surfaces of the lens are adjusted.

An amount of change of a back focus ($\Delta fm$) of each resin lens 61 and 62 in the main scanning direction (i.e., the amount of change from the image surface at the environmental temperature of 25° C.) is obtained as described below. The back focus fm in the main scanning direction denotes a distance between a surface of an imaging element that is the closest to the image surface of the optical beam spot in the third optical system and the image surface of the optical beam spot. An amount of change of the lens 61, caused by the environmental temperature change, in the position of the image surface at the environmental temperature 25° C. is shown:

|  | Image height | | | | | | | | |
|---|---|---|---|---|---|---|---|---|---|
|  | 150 | 120 | 80 | 40 | 0 | −40 | −80 | −120 | −150 |
| 10° C. | −0.817 | −0.740 | −0.756 | −0.829 | −0.867 | −0.829 | −0.756 | −0.737 | −0.808 |
| 45° C. | 1.068 | 0.968 | 0.991 | 1.088 | 1.139 | 1.089 | 0.991 | 0.964 | 1.057 |

An amount of change of the lens 62, caused by the environmental tempeature change, in the position of the image surface at the environmental temperature 25° C. is shown:

|  | Image height | | | | | | | | |
|---|---|---|---|---|---|---|---|---|---|
|  | 150 | 120 | 80 | 40 | 0 | −40 | −80 | −120 | −150 |
| 10° C. | 0.000 | −0.067 | −0.072 | −0.029 | −0.004 | −0.030 | −0.072 | −0.067 | −0.003 |
| 45° C. | 0.000 | 0.087 | 0.094 | 0.039 | 0.005 | 0.039 | 0.094 | 0.088 | 0.004 |

Based on the above obtained amounts, the amount of change in the back focus (i.e., $\Delta fm$) of each resin imaging element, caused by the environmental temperature change in the main scanning direction is obtained as described below.

(The amount of the back focus change: $\Delta fm$ of the lens 61 due to the environmental temperature change).

|  | Image height | | | | | | | | |
|---|---|---|---|---|---|---|---|---|---|
|  | 150 | 120 | 80 | 40 | 0 | −40 | −80 | −120 | −150 |
| $\Delta fm$ | −1.885 | 1.708 | 1.747 | 1.918 | 2.006 | 1.918 | 1.747 | 1.701 | 1.865 |

(The amount of the back focus change: $\Delta fm$ of the lens 62 due to the environmental temperature change).

|  | Image height | | | | | | | | |
|---|---|---|---|---|---|---|---|---|---|
|  | 150 | 120 | 80 | 40 | 0 | −40 | −80 | −120 | −150 |
| $\Delta fm$ | 0.000 | 0.154 | 0.166 | 0.068 | 0.009 | 0.069 | 0.166 | 0.155 | 0.007 |

Based on the above obtained amounts, a total sum of the change (i.e., $\Sigma\Delta fm$) is obtained as described below.

(The total sum of the change $\Sigma\Delta fm$ of the lenses 61 and 62).

| | Image height | | | | | | | | |
|---|---|---|---|---|---|---|---|---|---|
| | 150 | 120 | 80 | 40 | 0 | −40 | −80 | −120 | −150 |
| ΣΔfm | 1.885 | 1.862 | 1.913 | 1.986 | 2.015 | 1.987 | 1.913 | 1.856 | 1.872 |

Based on the above obtained amounts, because a maximum value (i.e., (ΣΔfm)max) and a minimum value (i.e., (ΣΔfm)min) of ΣΔfm is 2.015 at the image height 0 mm and 1.865 at the image height −120 mm, respectively, a value of a parameter of a condition (2), namely, $|\{(\Sigma\Delta fm)max-(\Sigma\Delta fm)min\}/\Delta T|$, becomes 0.005 which satisfies the condition (2), namely, $|\{(\Sigma\Delta fm)max-(\Sigma\Delta fm)min\}/\Delta T|<0.02$ [mm/° C.].

When the third optical system 6 includes at least two resin imaging elements, an optical property of each resin imaging element changes as the environmental temperature changes. The back focus fm changes because the environmental temperature changes due to the change in the optical property of the resin imaging elements. The change in the back focus fm represents a total sum of the change in the back focus of each resin imaging element.

For example, when the third optical system 6 includes two resin imaging elements, the two resin imaging elements are referred to as resin imaging elements A and B, respectively.

If the temperature change ΔT occurs only to the resin imaging element A while no temperature change ΔT occurs to the resin imaging element B and other imaging elements in the third optical system 6, an amount of change in the back focus in the main scanning direction is referred to as ΔfmA. Similarly, when the temperature change ΔT occurs only to the resin imaging element B and not to the resin imaging element A, the amount of change in the back focus in the main scanning direction is referred to as ΔfmB.

Thus, the amount of change in the back focus Δfm with respect to the change in the environmental temperature ΔT in the above described condition (2) denotes each of ΔfmA and ΔfmB. The total sum of the change ΣΔfm represents ΔfmA+ΔfmB.

Because the change in the shape of the image surface caused by the environmental temperature change is considered, the amount of change (i.e., Δfm) in the back focus (i.e., fm) is a function of an image height (i.e., H) of the optical beam spot. Thus, the total sum of the change ΣΔfm is a function of the image height H. Therefore, the maximum value (ΣΔfm)max and the minimum value (ΣΔfm)min in the effective writing region represent the maximum and minimum values in the total sum of change ΣΔfm(H) that is a function of the image height H.

The portion of the condition (2), namely $|\{(\Sigma\Delta fm)max-(\Sigma\Delta fm)min\}|$ shows an index of the amount of change in the shape of the image surface (i.e., an image-surface curvature) with respect to the environmental temperature change ΔT. Thus, the smaller this amount, the smaller the change in the shape of the image surface. The condition (2) shows that a degree of the change in the shape of the image surface per unit of a temperature change with respect to the environmental temperature change ΔT is smaller than 0.02 mm.

Because the third optical system 6 includes a plurality of resin imaging elements, the change of ΣΔfm at the image height H is kept to a minimum, namely a value obtained with the expression $|\{(\Sigma\Delta fm)max-(\Sigma\Delta fm)min\}|$ is kept small by adjusting a shape of each resin imaging element, thereby satisfying the condition (2).

Thus, the third optical system 6 is formed of two resin imaging elements.

Similarly, an amount of change (unit:mm) in the image-surface curvature at each image height (e.g., typically the image height of 0 mm, ±140 mm, ±80 mm, ±120 mm, and ±150 mm) in the sub-scanning direction at the environmental temperatures of 10° C. and 45° C. is obtained as described below.

| | Image height | | | | | | | | |
|---|---|---|---|---|---|---|---|---|---|
| | 150 | 120 | 80 | 40 | 0 | −40 | −80 | −120 | −150 |
| 10° C. | 0.058 | 0.049 | 0.026 | 0.005 | −0.001 | 0.010 | 0.034 | 0.056 | 0.064 |
| 45° C. | −0.025 | −0.010 | 0.023 | 0.053 | 0.062 | 0.046 | 0.012 | −0.020 | −0.034 |

Based on the above obtained amounts, ΔS is obtained as described below.

| | Image height | | | | | | | | |
|---|---|---|---|---|---|---|---|---|---|
| | 150 | 120 | 80 | 40 | 0 | −40 | −80 | −120 | −150 |
| ΔS | −0.083 | −0.059 | −0.003 | 0.049 | 0.063 | 0.036 | −0.022 | −0.076 | −0.098 |

Thus, because ΔSmax=0.063 at the image height 0 mm, ΔSmin=−0.083 at the image height 150 mm, and the change in the environmental temperature ΔT is 35° C. (i.e., ΔT=45−10=35° C.), a value of a parameter of a condition (3), namely, $|(\Delta Smax-\Delta Smin)/\Delta T|$, becomes 0.004, which satisfy the condition (3), namely, $|(\Delta Smax-\Delta Smin)/\Delta T|<0.01$ [mm/° C.].

The meaning of ΔS, ΔSmax, and ΔSmin corresponds to the meaning of ΔM, ΔMmax, and ΔMmin, repectively although ΔS, ΔSmax, and ΔSmin indicate amounts in the sub-scanning direction while ΔM, ΔMmax, and ΔMmin indicate amounts in the main scanning direction. When the resin imaging element in the third optical system 6 includes a lens, the condition (3) is satisfied even if the resin imaging optical system includes the single lens, with a shape of the incident and emerging surfaces of the lens adjusted.

An amount of back focus change (Δfm) of each resin lenses 61 and 62 in the sub-scanning direction (i.e., an amount of change from the image surface at the environmental temperature of 25° C.) is obtained as described below.

The meaning of Δfs, ΣΔfs, (ΣΔfs)max, and (ΣΔfs)min corresponds to the meaning of Δfm, ΣΔfm, (ΣΔfm)max, and (ΣΔfm)min, repectively although Δfs, ΣΔfs, (ΣΔfs)max, and (ΣΔfs)min indicate amounts in the sub-scanning direction while Δfm, ΣΔfm, (ΣΔfm)max, and (ΣΔfm)min indicate amounts in the main scanning direction.

Because the third optical system 6 includes a plurality of resin imaging elements, the change of ΣΔfs at the image height H is kept to a minimum, namely a value obtained with the expression $|\{(\Sigma\Delta fs)max-(\Sigma\Delta fs)min\}|$ is kept small by adjusting a shape of each resin imaging element, thereby satisfying the condition (4).

The scanning imaging optical system in the optical scanning device described in example 1 includes the first optical

| | Image height | | | | | | | | |
|---|---|---|---|---|---|---|---|---|---|
| | 150 | 120 | 80 | 40 | 0 | −40 | −80 | −120 | −150 |
| (An amount of change of the lens 61) | | | | | | | | | |
| 10° C. | −0.035 | −0.017 | −0.013 | −0.010 | −0.011 | −0.013 | −0.019 | −0.025 | −0.042 |
| 45° C. | 0.045 | 0.022 | 0.017 | 0.013 | 0.014 | 0.017 | 0.024 | 0.032 | 0.055 |
| (An amount of change of the lens 62) | | | | | | | | | |
| 10° C. | −0.946 | −0.989 | −1.036 | −1.076 | −1.089 | −1.070 | −1.028 | −0.979 | −0.935 |
| 45° C. | 1.248 | 1.306 | 1.369 | 1.422 | 1.439 | 1.415 | 1.357 | 1.291 | 1.233 |

Based on the above obtained amounts, the amount of back focus change (i.e., Δfs) of each resin imaging element, caused by the environmental temperature change, in the sub-scanning direction is obtained as described below.

system 2 that receives a light flux emitted from the light source 1, the second optical system 4 (i.e., a glass cylindrical lens having a focal length of 45 mm) that condenses the light flux to form a long linear image in the main scanning

| | Image height | | | | | | | | |
|---|---|---|---|---|---|---|---|---|---|
| | 150 | 120 | 80 | 40 | 0 | −40 | −80 | −120 | −150 |
| (The amount of change Δfs of the lens 61) | | | | | | | | | |
| ΔfS | 0.080 | 0.039 | 0.029 | 0.022 | 0.024 | 0.031 | 0.043 | 0.056 | 0.097 |
| (The amount of change Δfs of the lens 62) | | | | | | | | | |
| ΔfS | 2.195 | 2.295 | 2.405 | 2.497 | 2.258 | 2.486 | 2.385 | 2.270 | 2.168 |

Based on the above obtained amounts, a total sum of the change (i.e., ΣΔfs) is obtained as described below.

direction in the vicinity of a deflecting surface of the optical deflector 5, and the third optical system 6 condenses the light

| | Image height | | | | | | | | |
|---|---|---|---|---|---|---|---|---|---|
| | 150 | 120 | 80 | 40 | 0 | −40 | −80 | −120 | −150 |
| (The total sum of the change ΣΔfs of the lenses 61 and 62) | | | | | | | | | |
| ΣΔfS | 2.274 | 2.334 | 2.434 | 2.520 | 2.552 | 2.516 | 2.428 | 2.326 | 2.265 |

Based on the above obtained amounts, because a maximum value (i.e., (ΣΔfs)max) and a minimum value (i.e., (ΣΔfs)min) of ΣΔfs is 2.552 for the image height 0 mm and 2.265 at the image height −150 mm, respectively, and a value of a parameter of a condition (4), namely, $|\{(\Sigma\Delta fs)max-(\Sigma\Delta fs)min\}/\Delta T|$, becomes 0.008, which satisfies the condition (4), namely, $|\{(\Sigma\Delta fs)max-(\Sigma\Delta fs)min\}/\Delta T|<0.02$ [mm/° C.].

flux deflected by the optical deflector 5 toward the scanned surface 7 to form an optical beam spot on the scanned surface 7. The third optical system 6 includes at least one resin imaging element. A maximum value (i.e., ΔMmax) and a minimum value (i.e., ΔMmin) of an amount of change (i.e., ΔM) of an image-surface curvature in the main scanning direction at each image height in the effective writing region with respect to a change in an environmental temperature (i.e., ΔT) satisfy the condition (1), namely, |(ΔMmax−ΔMmin)/ΔT|<0.01 [mm/° C.].

The third optical system 6 includes at least two resin imaging elements 61 and 62. If an amount of the back focus change of each resin lens in the main scanning direction with respect to the change in the environmental temperature (i.e., ΔT) is denoted by Δfm, and the total sum of the back focus change of the at least two resin imaging elements is denoted by ΣΔfm, a maximum value (i.e., (ΣΔfm)max) and a minimum value (i.e., (ΣΔfm)min) of the total sum of the back focus change (i.e., ΣΔfm) at each image height in the effective writing region with respect to the change in the environmental temperature satisfy the condition (2), namely, |(ΣΔfm)max−(ΣΔfm)min/ΔT|<0.02 [mm m/° C.]. Thus, the third optical system 6 is formed of two resin imaging elements 61 and 62.

A maximum value (i.e., ΔSmax) and a minimum value (i.e., ΔSmin) of an amount of change (i.e., ΔS) in the image-surface curvature in the sub-scanning direction at each image height in the effective writing region with respect to the change in the environmental temperature (i.e., ΔT) satisfy the condition (3), namely, |(ΔSmax−ΔSmin)/ΔT|<0.01 [mm/° C.]. The third optical system 6 includes at least two resin imaging elements 61 and 62. In another example, the amount of the back focus change of each resin lens in the sub-scanning direction with respect to the change in the environmental temperature (i.e., ΔT) is denoted by Δfs, and a total sum of the back focus change of the at least two resin imaging elements is denoted by ΣΔfs, a maximum value (i.e., (ΣΔfs)max) and a minimum value (i.e., (ΣΔfs)min) of the total sum of the back focus change (i.e., ΣΔfs) at each image height in an effective writing region with respect to the change in the environmental temperature satisfy the condition (4), namely, |(ΣΔfs)max−(ΣΔfs)min/ΔT|<0.02 [mm/° C.]. Thus, the third optical system 6 is formed of two resin imaging elements 61 and 62.

The third optical system 6 includes two or more non-arc surfaces (i.e., 61a, 61b, and 62a) in the main scanning direction that have a coefficient of higher degree (i.e., eighth or greater degree).

A diameter of the optical beam spot, defined with an intensity 1/e2 in a line spread function of light intensity distribution of the optical beam spot on the scanned surface is denoted by ω, a width of a depth allowance W is then approximately expressed by W=1.49×ω2/λ when a wavelength of the light flux is denoted by λ.

A value of W is obtained as described below when the wavelength is 780 nm, and the diameter of the optical beam spot (i.e., ω) is 50 μm or 30 μm. Specifically, when the value of ω is 50 μm, the value of W is 4.8 mm and when the value of ω is 30 μm, the value of W is 1.7 mm. From the experiments performed by the present inventors, a change in the image surface of the optical beam spot caused by the change in the environmental temperature needs to be controlled at least in a range of not greater than ⅓ of the width of the depth allowance except for a variation in manufacturing optical parts and accuracy of assembling the optical parts.

A cause of the change in the image surface of the optical beam spot is broadly divided into two causes. One cause includes a shift of the position of the image surface which is referred to as the biasing component. The other cause includes a change in the shape of the image surface. The shift of the image surface position (i.e., biasing component) is corrected in a following manner. Optimizing a temperature change parameter of an entire optical system on an optical axis or having a combination of a resin lens that has a negative power and a glass lens that has a positive power. The temperature change parameter includes a variation in a wavelength, a shape, and a refractive index.

Under a general condition, an environmental temperature may change in a range of from 10° C. to 45° C. When the diameter of the optical beam spot is 50 μm, an allowable value for a change in the image surface of the optical beam spot caused by the change in the environmental temperature including the change in the image surface caused by the biasing component is calculated as 4.8 mm×(⅓)/(45° C.−10° C.)=0.046 mm/° C. When the diameter of the optical beam spot is 30 μm, the allowable value for the change in the image surface of the optical beam spot caused by the change in the environmental temperature including the change in the image surface caused by the biasing component is calculated as: 1.7 mm×(⅓)/(45° C.−10° C.)=0.016 mm/° C.

As described above, a change in the shape of the image surface of the optical beam spot caused by the change in the environmental temperature is effectively decreased in the first example. However, because the biasing component have an influence on the change in the image surface of the optical beam spot, a change in the size of the diameter of the optical beam spot is not regulated within the width of the depth allowance when the diameter of the optical beam spot is 50 μm or 30 μm. However, when the diameter of the optical beam spot is 70 μm, an allowable value for the change in the position of the image surface of the optical beam spot is 3.12 mm, thereby the change in the size of the diameter of the optical beam spot caused by the change in the position of the image surface in the first example is kept within the width of the depth allowance.

A Second Example

In the second example, the second optical system 4 includes at least one resin imaging element (i.e., lenses 10 and 11) having a negative power in the main scanning direction, and at least one glass imaging element (i.e., lens 12) having a positive power in the main scanning direction. The second optical system 4 further has a function of correcting the biasing component of a change in the image surface caused by the environmental temperature change in the third optical system 6.

Figure 2B:
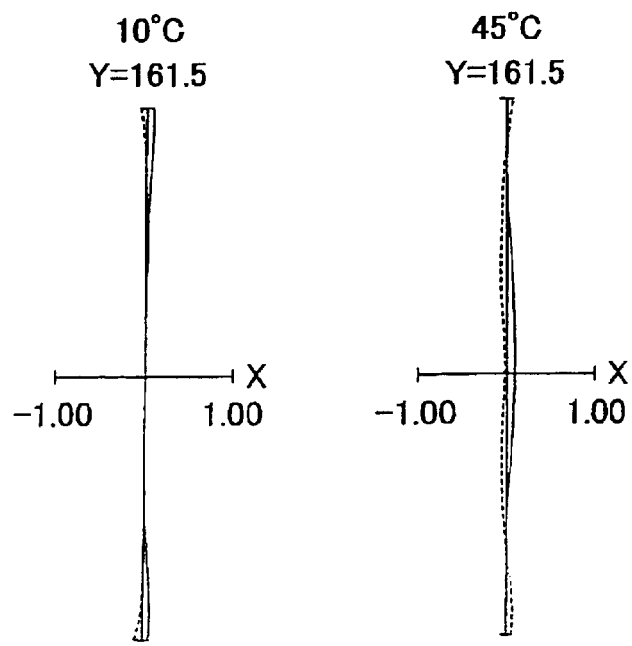

The graphs at the left and right end portions in FIGS. 2B illustrate the position of the image surface of the optical beam spot at the environmental temperatures 10° C. and 45° C., respectively, in the second example. A dotted line and a solid line denote the position of the image surface in the main and sub-scanning directions, respectively.

As illustrated in FIG. 2B, the positions of the image surface of the optical beam spot at the environmental temperatures of 10° C. and 45° C. do not substantially differ from that at the environmental temperatures of 25° C. in both main and sub-scanning directions in the second example. In the second example, a shape of the image surface of the optical beam spot changes in both main and sub-scanning directions as is the case with the first example. However, because the biasing component is effectively corrected, a change in the diameter of the optical beam spot is regulated within the width of the depth allowance, even though the size of the optical beam spot is targeted to be 30 μm in both main and sub-scanning directions.

Figure 4A:
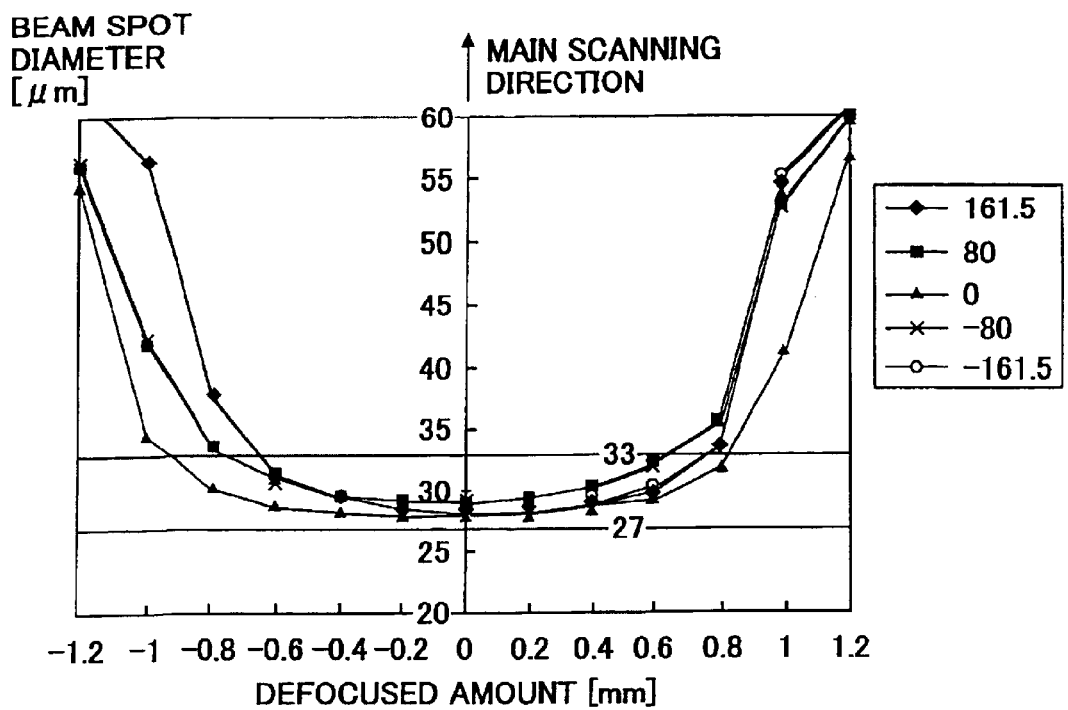
FIGS. 4A and 4B are graphs illustrating a relationship between an amount of a change in a position of the image surface of the optical beam spot from a scanned surface and a diameter of the optical beam spot in a main and sub-scanning directions, respectively.
Figure 4B:
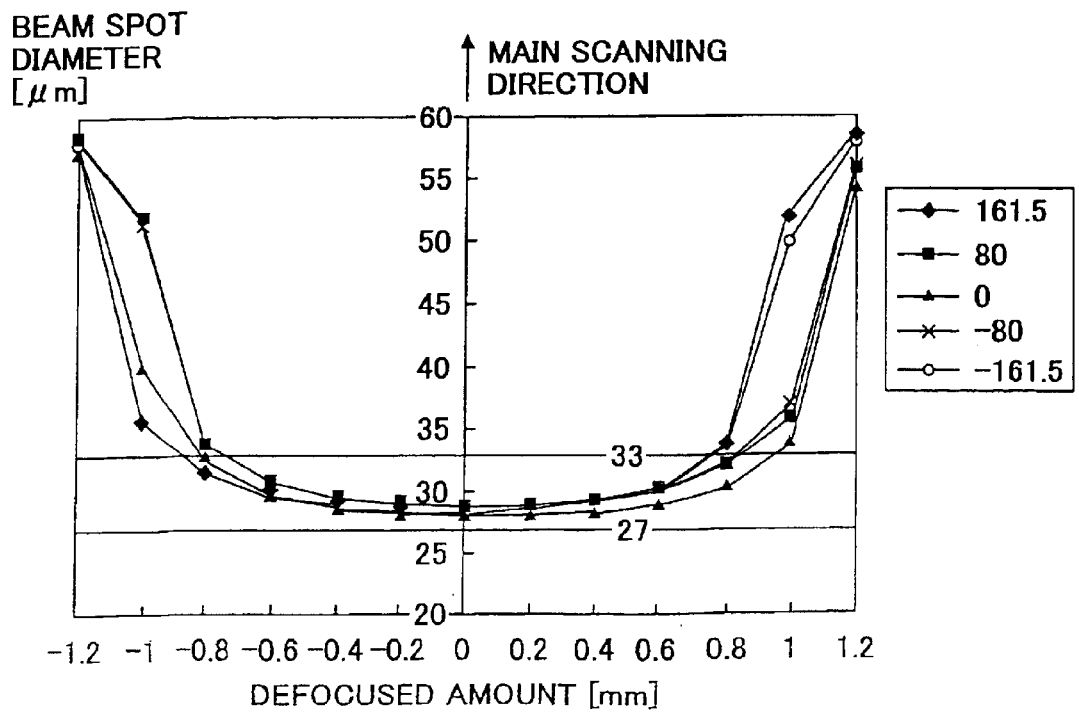
Figure 5A:
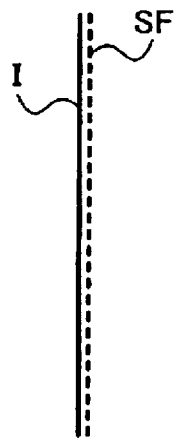
FIGS. 5A through 5F are drawings illustrating a shift of the position of the image surface of the optical beam spot and a change in a shape of the image surface of the optical beam spot caused by a change in an environmental temperature.
Figure 5B:
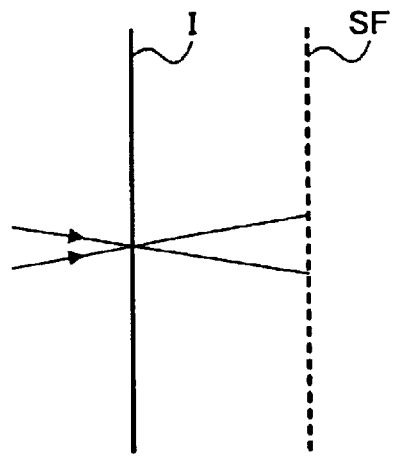
Figure 5C:
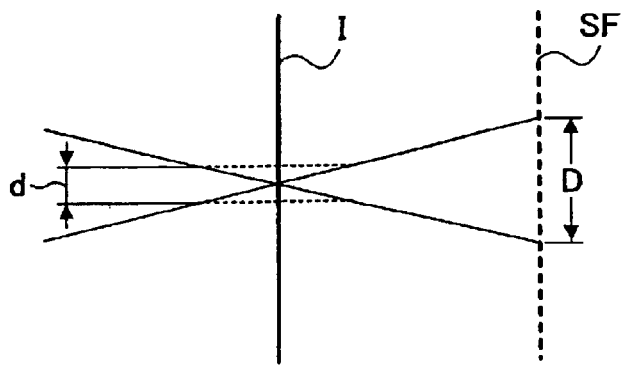
Figure 5D:
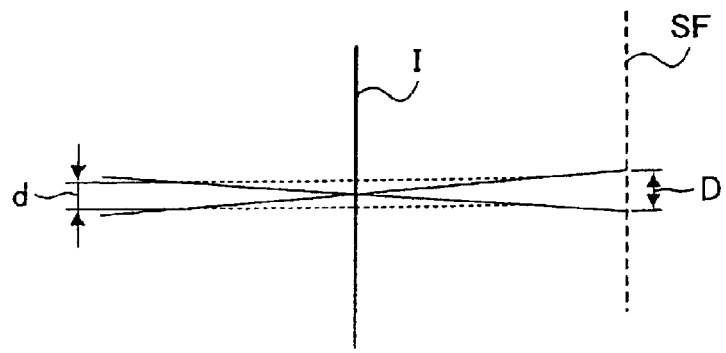
Figure 5E:
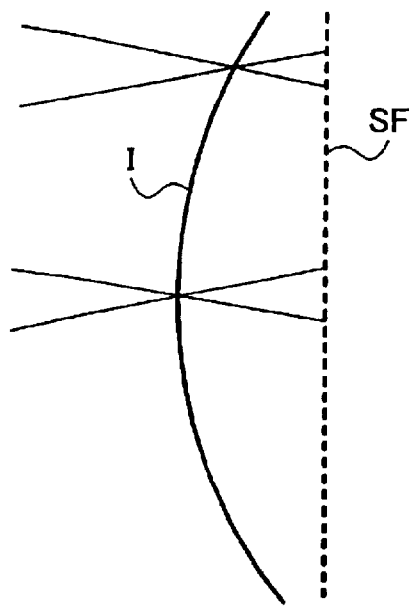
Figure 5F:
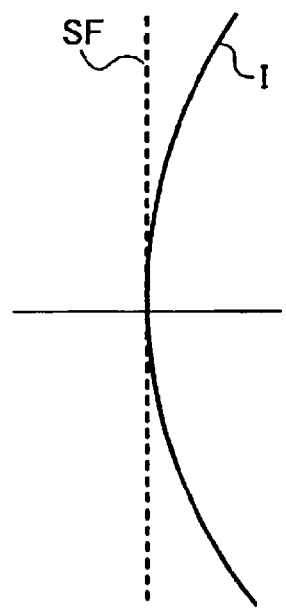

In the second example, a targeted diameter of the optical beam spot in both main and sub-scanning direction is set at 30 μm while a change in the diameter of the optical beam spot is set at 30 μm±3 μm. FIGS. 4A and 4B are graphs showing a relationship between an amount of a change in the position of the image surface of the optical beam spot from a scanned surface (i.e., a defocused amount) and the diameter of the optical beam spot in the main and sub-scanning directions, respectively.

As shown in the above figures, the width of the depth allowance equal to 1.5 mm or greater is accomplished for any image height up to ±161.5 mm (an effective writing width is ±150 mm).

In the second example, the amount of change (i.e., $\Delta M$) in the image-surface curvature in the main scanning direction with respect to the change in the environmental temperature of $\Delta T$ (i.e., 35° C.) satisfies a condition (5), namely $|\Delta S/\Delta T|<0.03$ [mm/° C.].

The third optical system 6 generally has a positive power in the main scanning direction, and the resin imaging element in the third optical system 6 shares a function to have the positive power. If a resin imaging element that has a negative power in the main scanning direction is provided in the second optical system 4, a shift of a position of the image surface of the optical beam spot, in which the entire image surface moves to a position parallel to itself in the main scanning direction (i.e., biasing component) is corrected. The amount of change (i.e., $\Delta S$) in the image-surface curvature in the sub-scanning direction with respect to the change in the environmental temperature of $\Delta T$ (i.e., 35° C.) satisfies a condition (6), namely $|\Delta S/\Delta T|<0.03$ [mm/° C.].

The third optical system 6 generally has a positive power in the sub-scanning direction, and the resin imaging element in the third optical system 6 shares a function to have the positive power. If the resin imaging element that has the negative power in the sub-scanning direction is provided in the second optical system 4, the biasing component of the change in the image surface is corrected.

In the second optical system 4, at least one lens surface of the resin imaging element (i.e., 11b) is configured to be a non-arc shape in the sub-scanning cross section. In the third optical system 6, at least one lens surface of the resin imaging element (i.e., 62b) is configured to be a non-arc shape in the sub-scanning cross section. Thus, a wavefront aberration is corrected by those non-arc lens surfaces.

Figure 3:
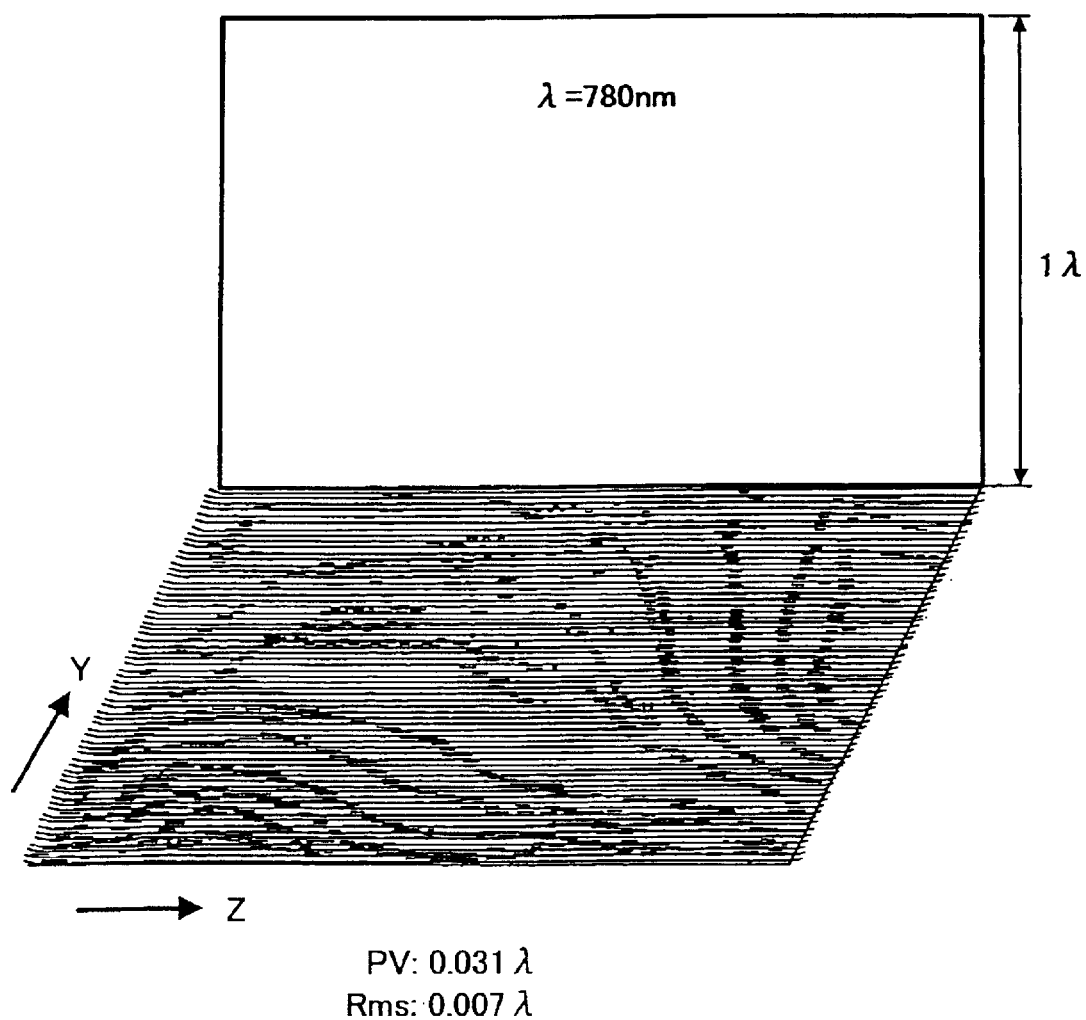
FIG. 3 is a drawing illustrating a wavefront aberration of an entire optical system at an image height of 0 mm.

FIG. 3 is a drawing showing a wavefront aberration of an entire optical system at an image height of 0 mm (i.e., zero) in the second example. A peak value (i.e., PV) is 0.031 λ and RMS (i.e., root mean square) is 0.007 λ. Hence, the wavefront aberration is satisfactory corrected. Because a deflected light flux has the satisfactory corrected wavefront aberration, the optical beam spot formed on the scanned surface has a satisfactory shape and a good intensity distribution.

The resin imaging elements used in the first and second optical systems in both the first and second examples are formed of polyolefin resin.

In the optical scanning device shown in FIGS. 1A–1D, the first optical system 2 receives a diverging light flux emitted from the light source 1. The second optical system 4 forms the light flux received from the first optical system into a long linear image in the main scanning direction in the vicinity of the deflecting surface 5A of the optical deflector 5. The optical deflector 5 deflects the flight flux. The third optical system 6 condenses the deflected light flux toward the scanned surface 7 to form an optical beam spot on the scanned surface 7. The optical scanning device includes the scanning imaging optical system described in the first and second examples as the scanning imaging optical system that includes the first, second, and third optical systems.

The scanning imaging optical system, which includes the scanning optical system described in the second example, has a function to correct the biasing component that changes the imaging position of the optical beam spot. The second optical system 4 has a function to correct the biasing component.

In the optical scanning device of FIGS. 1A–1D, which includes the scanning imaging optical system described in the second example, a size of a diameter of an optical beam spot on a scanned surface, defined with an intensity 1/e2 in a line spread function of light intensity distribution of the optical beam spot is equal to 50 μm or smaller (30 μm is targeted) at least in the main scanning direction.

The optical scanning device of FIGS. 1A–1D, which includes the scanning imaging optical system described in the first and second examples, includes a multi-beam scanning system and a semiconductor laser array as the light source 1.

Figure 6:
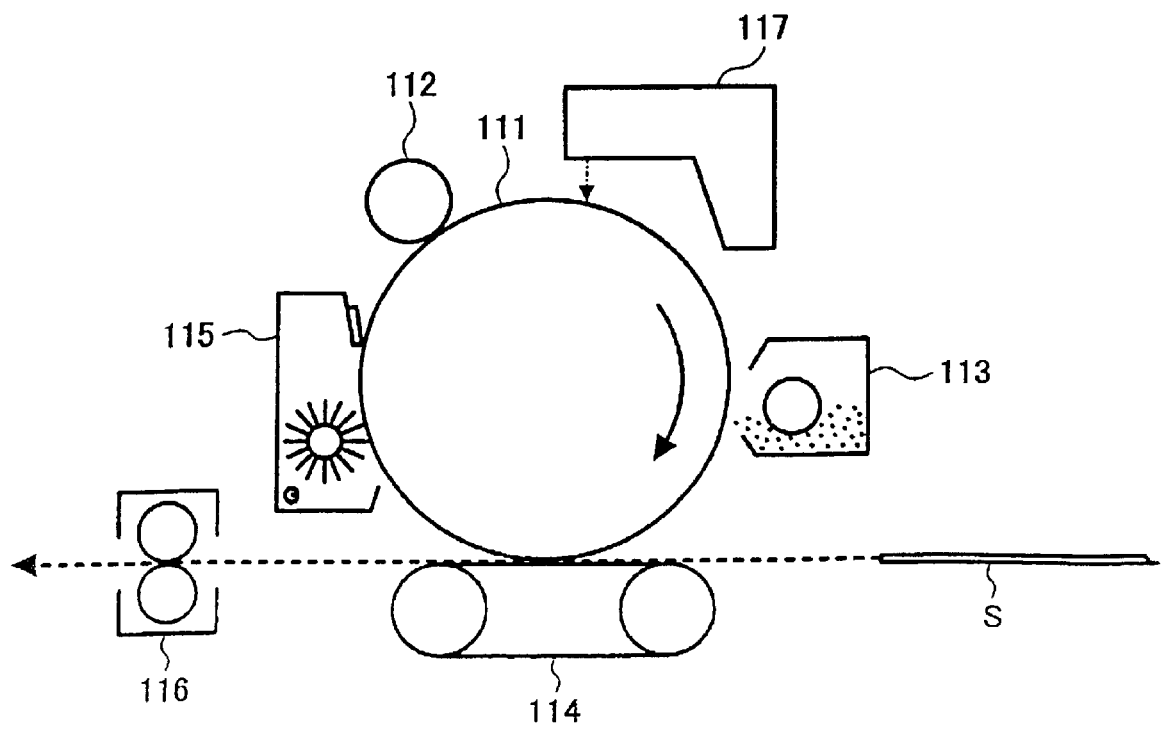
FIG. 6 is a drawing illustrating a construction of an image forming apparatus.

FIG. 6 is a drawing showing a construction of the image forming apparatus. The image forming apparatus is a laser printer in this non-limiting example. The laser printer includes a cylindrically formed photosensitive element 111 as a photosensitive medium. Around the photosensitive element 111, a charging device 112 (a contacting charging roller is described, however, a corona charger or a charging brush may be employed), a developing device 113, a transfer device 114 (a transfer belt is described, however a transfer roller or a device using a corona discharge may be employed), a cleaning device 115, and a fixing device 116 are arranged.

The image forming apparatus further includes an optical scanning device 117 that is provided to optically write an image on the surface of the photosensitive element 111 between the charging device 112 and developing device 113. For example, the optical scanning device illustrated in FIGS. 1A–1D is employed as the optical scanning device 117.

When an image is formed, the photosensitive element 111 rotates at a constant speed in a direction indicated by an arrow in FIG. 6. The charging device 112 uniformly charges the surface of the photosensitive element 111. The optical scanning device 117 exposes the surface of the photosensitive element 111 with a laser beam to form an electrostatic latent image thereon. The electrostatic latent image is a negative latent image.

This electrostatic latent image is reversely developed by the developing device 113. Thus, a toner image is formed on the surface of the photosensitive element 111. The toner image is then transferred onto a sheet-like recording medium S including a transfer sheet and an overhead transparency film sheet. The transferred image is fixed by the fixing device 116.

The sheet-like recording medium S having the fixed toner image thereon is discharged. After the toner image has been transferred onto the sheet-like recording medium S, residual toner and a paper lint remaining on the surface of the photosensitive element 111 is removed by the cleaning device 115.

Obviously, numerous additional modifications and variations of the present invention are possible in light of the above teachings. It is therefore to be understood that within the scope of the appended claims, the present invention may be practiced otherwise than as specifically described herein.

This document claims priority and contains subject matter related to Japanese Patent Application No. 2001-229213, filed on Jul. 30, 2001, and the entire contents thereof are herein incorporated by reference.

What is claimed as new is:

1. A scanning imaging optical system, comprising:
   a first optical system configured to receive a light flux from a light source;
   a second optical system configured to receive the light flux from the first optical system and condense the light flux to form a long linear image in a main scanning direction in a vicinity of a deflecting surface of an optical deflector; and
   a third optical system including at least one resin imaging element, and configured to condense a light flux deflected by the optical deflector toward a scanned surface to form an optical beam spot on the scanned surface,
   wherein a maximum value $\Delta M$max and a minimum value $\Delta M$min of an amount of change $\Delta M$ in an image-surface curvature in the main scanning direction at each image height in an effective writing region with respect to a change $\Delta T$ in an environmental temperature satisfy a condition:

$|(\Delta M \text{max} - \Delta M \text{min})/\Delta T| < 0.01$ (mm/° C.)

wherein when an amount of a back focus change of each resin lens in the main scanning direction with respect to the change $\Delta T$ in the environmental temperature is denoted by $\Delta fm$, and a total sum of the back focus change of the at least two resin imagine elements is denoted by $\Sigma \Delta fm$, a maximum value $(\Sigma \Delta fm)$max and a minimum value $(\Sigma \Delta fm)$min of the total sum of the back focus change $\Sigma \Delta fm$ at each image height in the effective writing region with respect to the change in the environmental temperature satisfy a condition:

$|\{(\Sigma \Delta fm)\text{max} - (\Sigma \Delta fm)\text{min}\}/\Delta T| < 0.02 (mm/° C.)$.

2. The scanning imaging optical system according to claim 1, wherein the third optical system includes two resin imaging elements.

3. The scanning imaging optical system according to claim 1, wherein the third optical system comprises at least one resin imaging element with at least two non-arc surfaces in the main scanning direction that have a coefficient equal or greater than an 8th degree.

4. The scanning imaging optical system according to claim 1, wherein the second optical system comprises at least one resin imaging element having a negative power in the main scanning direction and at least one glass imaging element having a positive power in the main scanning direction, and
   wherein the amount of change $\Delta M$ in the image-surface curvature in the main scanning direction with respect to the change $\Delta T$ in the environmental temperature satisfy a further condition:

$|\Delta m/\Delta T| < 0.03(mm/° C.)$.

5. The scanning imaging optical system according to claim 4, wherein at least one lens surface of the resin imaging element in the second optical system is configured to be a non-arc shape in a sub-scanning cross section, and at least one lens surface of the resin imaging element in the third optical system is configured to be a non-arc shape in the sub-scanning cross section to correct a wavefront aberration.

6. The scanning imaging optical system according to claim 1, wherein resin imaging elements used in the second and third optical systems are formed of polyolefin resin.

7. A scanning imaging optical system, comprising:
   a first optical system configured to receive a light flux from a light source;
   a second optical system configured to receive the light flux from the first optical system and condense the light flux to form a long linear image in a main scanning direction in a vicinity of a deflecting surface of an optical deflector; and
   a third optical system including at least one resin imaging element, and configured to condense a light flux deflected by the optical deflector toward a scanned surface to form an optical beam spot on the scanned surface,
   wherein a maximum value $\Delta S$max and a minimum value $\Delta S$min of an amount of change $\Delta S$ in an image-surface curvature in a sub-scanning direction at each image height in an effective writing region with respect to a change $\Delta T$ in an environmental temperature satisfy a condition:

$|(\Delta S \text{max} - \Delta S \text{min})/\Delta T| < 0.01(mm/° C.)$, and wherein when an amount of a back focus change of each resin lens in the sub-scanning direction with respect to the change $\Delta T$ in the environmental temperature is denoted by $\Delta fs$, and a total sum of the back focus chance of the at least two resin imagine elements is denoted by $\Delta fs$, a maximum value $(\Sigma \Delta fs)$max and a minimum value $(\Sigma \Delta fs)$min of the total sum of the back focus change $\Sigma \Delta fs$ at each image height in the effective writing region with respect to the change in the environmental temperature satisfy a condition:

$|\{(\Sigma \Delta fs)\text{max} - (\Sigma \Delta fs),\text{im}\}/\Delta T| < 0.05(mm/° C.)$.

8. The scanning imaging optical system according to claim 7, the third optical system includes two resin imaging elements.

9. The scanning imaging optical system according to claim 7, wherein the third optical system comprises at least one resin imaging element with at least two non-arc surfaces in the main scanning direction that have a coefficient equal or greater than an 8th degree.

10. The scanning imaging optical system according to claim 7, wherein the second optical system comprises at least one glass imaging element having a negative power in the sub-scanning direction and at least one resin imaging element having a positive power in the sub-scanning direction, and
    wherein the amount of change $\Delta S$ in the image-surface curvature in the sub-scanning direction with respect to the change $\Delta T$ in the environmental temperature satisfy a further condition: $|\Delta S/\Delta T| < 0.03(mm/° C.)$.

11. The scanning imaging optical system according to claim 10, wherein at least one lens surface of the resin imaging element in the second optical system is configured to be a non-arc shape in a sub-scanning cross section, and at least one lens surface of the resin imaging element in the third optical system is configured to be a non-arc shape in the sub-scanning cross section to correct a wavefront aberration.

12. The scanning imaging optical system according to claim 7, wherein resin imaging elements used in the second and third optical systems are formed of polyolefin resin.

13. An optical scanning device comprising:
    a scanning imaging optical system including,
    a first optical system configured to receive a light flux from a light source, a second optical system configured to receive the light flux from the first optical system and condense the light flux to form a long linear image in a main scanning direction in a vicinity of a deflecting surface of an optical deflector, and a third optical system including at least one resin imaging element, and configured to condense a light flux deflected by the optical deflector toward a scanned surface to form an optical beam spot on the scanned surface, wherein a maximum value ΔMmax and a minimum value ΔMmin of an amount of change ΔM in an image-surface curvature in the main scanning direction at each image height in an effective writing region with respect to a change ΔT in an environmental temperature satisfy a condition:

|(ΔMmax−ΔMmin)/ΔT|<0.01 (mm/° C.), and wherein when an amount of a back focus change of each resin lens in the main scanning direction with respect to the change ΔT in the environmental temperature is denoted by Δfm, and a total sum of the back focus change of the at least two resin imaging elements is denoted by ΣΔfm, a maximum value (ΣΔfm)max and a minimum value (ΣΔfm)min of the total sum of the back focus change ΣΔfm at each image height in the effective writing region with respect to the change in the environmental temperature satisfy a condition:

|{(ΣΔfm)max−(ΣΔfm)min}/ΔT|<0.02(mm/° C.).

14. The optical scanning device according to claim 13, wherein the scanning imaging optical system corrects a biasing component of a change in an image surface caused in the third optical system due to the environmental temperature change.

15. The optical scanning device according to claim 14, wherein the second optical system comprises:

at least one resin imaging element having a negative power in the main scanning direction and at least one glass imaging element having a positive power in the main scanning direction, the amount of change ΔM in the image-surface curvature in the main scanning direction with respect to the change ΔT in the environmental temperature satisfy a further condition: |ΔM/ΔT|<0.03) mm/° C.), and wherein the scanning imaging optical system corrects the biasing component of the change in the image surface caused in the third optical system due to the environmental temperature change.

16. The optical scanning device according to claim 13, wherein a size of a diameter of an optical beam spot formed on the scanned surface, defined by an intensity 1/e² in a line spread function of light intensity distribution of the optical beam spot, is equal to 50 μm or smaller at least in the main scanning direction.

17. The optical scanning device according to claim 13, further comprising a multi-beam scanning system.

18. The optical scanning device according to claim 17, wherein the light source is a semiconductor laser array.

19. An optical scanning device, comprising:
a scanning imaging optical system including,
a first optical system configured to receive a light flux from a light source,
a second optical system configured to receive the light flux from the first optical system and condense the light flux to form a long linear image in a main scanning direction in a vicinity of a deflecting surface of an optical deflector, and a third optical system including at least one resin imaging element, and configured to condense a light flux deflected by the optical deflector toward a scanned surface to form an optical beam spot on the scanned surface, wherein a maximum value ΔSmax and a minimum value ΔSmin of an amount of change ΔS in an image-surface curvature in a sub-scanning direction at each image height in an effective writing region with respect to a change ΔT in an environmental temperature satisfy a condition of:

|(ΔSmax−ΔSmin)/ΔT|<0.01(mm/° C.), and wherein when an amount of a back focus change of each resin lens in the sub-scanning direction with respect to the change ΔT in the environmental temperature is denoted by Δfs, and a total sum of the back focus change of the at least two resin imaging elements is denoted by ΣΔfs, a maximum value (ΣΔfs)max and a minimum value (ΣΔfs)min of the total sum of the back focus change ΣΔfs at each image height in the effective writing region with respect to the change in the environmental temperature satisfy a condition:

|{(ΣΔfs)max−(ΣΔfs)min}/ΔT|<0.02(mm/° C.).

20. The optical scanning device according to claim 19, wherein the scanning imaging optical system corrects a biasing component of a change in an image surface caused in the third optical system due to the environmental temperature change.

21. The optical scanning device according to claim 20, wherein the second optical system comprises:

at least one resin imaging element having a negative power in the sub-scanning direction and at least one glass imaging element having a positive power in the sub-scanning direction, wherein the amount of change ΔS in the image-surface curvature in the sub-scanning direction with respect to the change ΔT in the environmental temperature satisfy a further condition: |ΔS/ΔT|<0.03 (mm/° C.), and wherein the scanning imaging optical system corrects the biasing component of the change in the image surface caused in the third optical system due to the environmental temperature change.

22. The optical scanning device according to claim 19, wherein a size of a diameter of an optical beam spot formed on the scanned surface, defined by an intensity 1/e² in a line spread function of light intensity distribution of the optical beam spot, is equal to 50 μm or smaller at least in the main scanning direction.

23. The optical scanning device according to claim 19, further comprising a multi-beam scanning system.

24. The optical scanning device according to claim 23, wherein the light source is a semiconductor laser array.

25. An image forming apparatus, comprising:
a photosensitive medium configured to be optically scanned; and
an optical scanning device comprising a scanning imaging optical system, including,
a first optical system configured to receive a light flux emitted from a light source,
a second optical system configured to receive the light flux from the first optical system and condense the light flux to form a long linear image in a main scanning direction in a vicinity of a deflecting surface of an optical deflector, and a third optical system including at least one resin imaging element, and configured to condense a light flux deflected by the optical deflector toward a scanned surface to form an optical beam spot on the scanned surface, including at least one resin imaging element and wherein a maximum value ΔMmax and a minimum value ΔMmin of an amount of change ΔM in an image-surface curvature in the main scanning direction at each image height in an effective writing region with respect to a change ΔT in an environmental temperature satisfy a condition:

|(ΔMmax−ΔMmin)/ΔT|<0.01 (mm/° C), and wherein when an amount of a back focus change of each resin lens in the main scanning direction with respect to the change ΔT in the environmental temperature is denoted by Δfm, and a total sum of the back focus change of the at least two resin imaging elements is denoted by Δfm, a maximum value (ΣΔfm)max and a minimum value (ΣΔfm)min of the total sum of the back focus change ΣΔfm at each image height in the effective writing region with respect to the change in the environmental temperature satisfy a condition:

|{(ΣΔfm)max−(ΣΔfm)min}/ΔT|0.02 (mm/° C.).

26. The image forming apparatus according to claim 25, wherein a latent image is formed on a surface of the photosensitive medium by an optical scanning operation and the latent image is visualized.

27. The image forming apparatus according to claim 26, wherein the photosensitive medium includes a photosensitive element and the latent image includes an electrostatic latent image, and wherein the electrostatic latent image is visualized as a toner image and the toner image is carried on a sheet-like recording medium.

28. An image forming apparatus, comprising a photosensitive medium configured to be optically scanned; and an optical scanning device comprising a scanning imaging optical system, including, a first optical system configured to receive a light flux emitted from a light source, a second optical system configured to receive the light flux from the first optical system and condense the light flux to form a long linear image in a main scanning direction in a vicinity of a deflecting surface of an optical deflector, and a third optical system including at least one resin imaging element, and configured to condense a light flux deflected by the optical deflector toward a scanned surface to form an optical beam spot on the scanned surface, wherein a maximum value ΔSmax and a minimum value ΔSmin of an amount of change ΔS in an image-surface curvature in a sub-scanning direction at each image height in an effective writing region with respect to a change ΔT in an environmental temperature satisfy a condition:

|(ΔSmax−ΔSmin)/ΔT|<0.01 (mm/° C.), and wherein when an amount of a back focus chance of each resin lens in the sub-scanning direction with respect to the change ΔT in the environmental temperature is denoted by Δfs, and a total sum of the back focus change of the at least two resin imaging elements is denoted by ΣΔfs, a maximum value (ΣΔfs)max and a minimum value (ΣΔfs)min of the total sum of the back focus change ΣΔfs at each image height in the effective writing region with respect to the change in the environmental temperature satisfy a condition:

|{(ΣΔfs)max−(ΣΔfs)min}/ΔT|<0.02 (mm/° C.).

29. The image forming apparatus according to claim 28, wherein a latent image is formed on a surface of the photosensitive medium by an optical scanning operation and the latent image is visualized.

30. The image forming apparatus according to claim 29, wherein the photosensitive medium includes a photosensitive element and the latent image includes an electrostatic latent image, and wherein the electrostatic latent image is visualized as a toner image and the toner image is carried on a sheet-like recording medium.

31. A scanning imaging optical system, comprising:

first optical means for receiving a light flux emitted from a light source means;

second optical means for receiving the light flux from the first optical means and condensing the light flux to form a long linear image in a main scanning direction in a vicinity of a deflecting surface of an optical deflector means; and third optical means including at least one resin imaging means, and for condensing a light flux deflected by the optical deflector means toward a scanned surface to form an optical beam spot on the scanned surface, wherein a maximum value ΔMmax and a minimum value ΔMmin of an amount of change ΔM in an image-surface curvature in the main scanning direction at each image height in an effective writing region with respect to a change ΔT in an environmental temperature satisfy a condition:

|(ΔMmax−ΔMmin)/ΔT|<0.01 (mm/° C.), and wherein when an amount of a back focus change of each resin lens in the main scanning direction with respect to the change ΔT in the environmental temperature is denoted by Δfm, and a total sum of the back focus change of the at least two resin imaging a elements is denoted by Δfm, a maximum value (ΣΔfm)max and a minimum value (ΣΔfm)min of the total sum of the back focus change ΣΔfm at each image height in the effective writing region with respect to the change in the environmental temperature satisfy a condition:

|{(ΣΔfm)max−(ΣΔfm)min}/ΔT|<0.02 (mm° C.).

32. A scanning imaging optical system, comprising:

first optical means for receiving a light flux emitted from a light source means;

second optical means for receiving the light flux from the first optical means and condensing the light flux to form a long linear image in a main scanning direction in a vicinity of a deflecting surface of an optical deflector means; and third optical means including at least one resin imaging element means for condensing a light flux deflected by the optical deflector means toward a scanned surface to form an optical beam spot on the scanned surface, wherein a maximum value ΔSmax and a minimum value ΔSmin of an amount of change ΔS in an image-surface curvature in a sub-scanning direction at each image height in an effective writing region with respect to a change ΔT in an environmental temperature satisfy a condition:

|(ΔSmax−ΔSmin)/ΔT|<0.01 (mm/° C.).

wherein when an amount of a back focus change of each resin lens in the sub-scanning direction with respect to the change ΔT in the environmental temperature is denoted by Δfs, and a total sum of the back focus change of the at least two resin imaging elements is denoted by ΣΔfs, a maximum value (ΣΔfs)max and a minimum value (ΣΔfs)min of the total sum of the back focus change ΣΔfs at each image height in the effective writing region with respect to the change in the environmental temperature satisfy a condition:

|{(ΣΔfs)max−(ΣΔfs)min}|ΔT|<0.02 (mm/° C.).

33. An optical scanning device, comprising:

a scanning imaging optical system including, first optical means for receiving a light flux emitted from a light source means, second optical means for receiving the light flux from the first optical means and condensing the light flux to form a long linear image in a main scanning direction in a vicinity of a deflecting surface of an optical deflector means, and third optical means including at least one resin imaging element means for condensing a light flux deflected by the optical deflector means toward a scanned surface to form an optical beam spot on the scanned surface, wherein a maximum value ΔMmax and a minimum value ΔMmin of an amount of change ΔM in an image-surface curvature in the main scanning direction at each image height in an effective writing region with respect to a change ΔT in an environmental temperature satisfy a condition:

|(ΔMmax−ΔMmin)/ΔT|<0.01 (mm° C.), and wherein when an amount of a back focus change of each resin lens in the main scanning direction with respect to the change ΔT in the environmental temperature is denoted by Δfm, and a total sum of the back focus change of the at least two resin imaging elements is denoted by ΣΔfm, a maximum value (ΣΔfm)max and a minimum value (ΣΔfm)min of the total sum of the back focus change ΣΔfm at each image height in the effective writing region with respect to the change in the environmental temperature satisfy a condition:

|{(ΣΔfm)max−(ΣΔfm)min}/ΔT|<0.02 (mm° C.).

34. An optical scanning device, comprising:

a scanning imaging optical system including, first optical means for receiving a light flux emitted from a light source means, second optical means for receiving the light flux from the first optical means and condensing the light flux to form a long linear image in a main scanning direction in a vicinity of a deflecting surface of an optical deflector means, and third optical means including at least one resin imaging means for condensing a light flux deflected by the optical deflector means toward a scanned surface to form an optical beam spot on the scanned surface, wherein a maximum value ΔSmax and a minimum value ΔSmin of an amount of change ΔS in an image-surface curvature in a sub-scanning direction at each image height in an effective writing region with respect to a change ΔT in an environmental temperature satisfy a condition:

|(ΔSmax−ΔSmin)/ΔT|<0.01 (mm/° C.).

wherein when an amount of a back focus change of each resin lens in the sub-scanning direction with respect to the change ΔT in the environmental temperature is denoted by Δfs, and a total sum of the back focus change of the at least two resin imaging elements is denoted by ΣΔfs, a maximum value (ΣΔfs)max and a minimum value (ΣΔfs)min of the total sum of the back focus change ΣΔfs at each image height in the effective writing region with respect to the change in the environmental temperature satisfy a condition:

|{(ΣΔfs)max−(ΣΔfs)min }/ΔT|<0.02 (mm/° C.).

35. An image forming apparatus, comprising:

photosensitive means for being optically scanned; and optical scanning means for scanning and including a scanning imaging optical means for producing a modulated light beam, the scanning imaging optical means including, first optical means for receiving a light flux emitted from a light source, second optical means for receiving the light flux from the first optical means and condensing the light flux to form a long linear image in a main scanning direction in a vicinity of a deflecting surface of an optical deflector means, and third optical means including at least one resin imaging means for condensing a light flux deflected by the optical deflector means toward a scanned surface to form an optical beam spot on the scanned surface, wherein a maximum value ΔMmax and a minimum value ΔMmin of an amount of change ΔM in an image-surface curvature in the main scanning direction at each image height in an effective writing region with respect to a change ΔT in an environmental temperature satisfy a condition:

|(ΔMmax−ΔMmin)/ΔT|<0.01 (mm/° C.), and wherein when an amount of a back focus change of each resin lens in the main scanning direction with respect to the change ΔT in the environmental temperature is denoted by Δfm, and a total sum of the back focus change of the at least two resin imaging elements is denoted by ΣΔfm, a maximum value (ΣΔfm)max and a minimum value (ΣΔfm)min of the total sum of the back focus change ΣΔfm at each image height in the effective writing region with respect to the change in the environmental temperature satisfy a condition:

|{(ΣΔfm)max−(ΣΔfm)min}/ΔT|<0.02 (mm/° C.).

36. An image forming apparatus, comprising:

photosensitive means for being optically scanned; and optical scanning means for scanning including a scanning imaging optical means for producing a modulated light beam, the scanning imaging optical means including, first optical means for receiving a light flux emitted from a light source means, second optical means for receiving the light flux from the first optical means and condensing the light flux to form a long linear image in a main scanning direction in a vicinity of a deflecting surface of an optical deflector means, and third optical means including at least one resin imaging means for condensing the light flux deflected by the optical deflector means toward a scanned surface to form an optical beam spot on the scanned surface, the third optical means wherein a maximum value ΔSmax and a minimum value ΔSmin of an amount of change ΔS in an image-surface curvature in a sub-scanning direction at each image height in an effective writing region with respect to a change ΔT in an environmental temperature satisfy a condition:

$|(\Delta Smax-\Delta Smin)/\Delta T|<0.01$ $(mm/°\ C.)$, and wherein when an amount of a back focus change of each resin lens in the sub-scanning direction with respect to the change ΔT in the environmental temperature is denoted by Δfs, and a total sum of the back focus change of the at least two resin imaging elements is denoted by ΣΔfs, a maximum value (ΣΔfs)max and a minimum value (ΣΔfs)min of the total sum of the back focus change ΣΔfs at each image height in the effective writing region with respect to the change in the environmental temperature satisfy a condition:

$|\{(\Sigma \Delta fs)max-(\Sigma \Delta fs)min\}/\Delta T|<0.02$ $(mm/°\ C.)$.

37. A method of scanning an image, comprising:

coupling a light flux emitted from a light source to an optical system;

receiving the light flux from the coupling and condensing the light flux to form a long linear image in a main scanning direction in a vicinity of a deflecting surface of an optical deflector; and condensing a light flux deflected by the optical deflector toward a scanned surface to form an optical beam spot on the scanned surface, wherein a maximum value ΔMmax and a minimum value ΔMmin of an amount of change ΔM in an image-surface curvature in the main scanning direction at each image height in an effective writing region with respect to a change ΔT in an environmental temperature satisfy a condition:

$|(\Delta Mmax-\Delta Mmin)/\Delta T|<0.01$ $(mm/°\ C.)$.

wherein when an amount of a back focus change of each resin lens in the main scanning direction with respect to the change ΔT in the environmental temperature is denoted by Δfm, and a total sum of the back focus change of the at least two resin imaging elements is denoted by ΣΔfm, a maximum value (ΣΔfm)max and a minimum value (ΣΔfm)min of the total sum of the back focus change ΣΔfm at each image height in the effective writing region with respect to the change in the environmental temperature satisfy a condition:

$|\{(\Sigma \Delta fm)max-(\Sigma \Delta fm)min\}/\Delta T|<0.02$ $(mm/°\ C.)$.

38. A method of scanning an image, comprising:

coupling a light flux emitted from a light source to an optical system;

receiving the light flux from the coupling and condensing the light flux to form a long linear image in a main scanning direction in a vicinity of a deflecting surface of an optical deflector; and condensing the light flux deflected by the optical deflector toward a scanned surface to form an optical beam spot on the scanned surface, wherein a maximum value ΔSmax and a minimum value ΔSmin of an amount of change ΔS in an image-surface curvature in a sub-scanning direction at each image height in an effective writing region with respect to a change ΔT in an environmental temperature satisfy a condition:

$|(\Delta Smax-\Delta Smin)/\Delta T|<0.01$ $(mm/°\ C.)$, and wherein when an amount of a back focus change of each resin lens in the sub-scanning direction with respect to the change ΔT in the environmental temperature is denoted by Δfs, and a total sum of the back focus change of the at least two resin imaging elements is denoted by ΣΔfs, a maximum value (ΣΔfs)max and a minimum value (ΣΔfs)min of the total sum of the back focus change ΣΔfs at each image height in the effective writing region with respect to the change in the environmental temperature satisfy a condition:

$|\{(\Sigma \Delta fs)max-(\Sigma \Delta fs)min\}/\Delta T|<0.02$ $(mm/°\ C.)$.

39. A method of manufacturing an optical scanning device, comprising:

providing a photosensitive medium configured to be optically scanned; and providing an optical scanning device comprising a scanning imaging optical system, the scanning imaging optical system including, a first optical system configured to receive a light flux from a light source, a second optical system configured to receive the light flux from the first optical system and condense the light flux to form a long linear image in a main scanning direction in a vicinity of a deflecting surface of an optical deflector, and a third optical system including at least one resin imaging element, and configured to condense a light flux deflected by the optical deflector toward a scanned surface to form an optical beam spot on the scanned surface, wherein a maximum value ΔMmax and minimum value ΔMmin of an amount of change ΔM in an image-surface curvature in the main scanning direction at each image height in an effective writing region with respect to a change ΔT in an environmental temperature satisfy a condition:

$|(\Delta Mmax-\Delta Mmin)/\Delta T|<0.01$ $(mm/°\ C.)$, and wherein when an amount of a back focus change of each resin lens in the main scanning direction with respect to the change ΔT in the environmental temperature is denoted by Δfm, and a total sum of the back focus change of the at least two resin imaging elements is denoted by ΣΔfm, a maximum value (ΣΔfm)max and a minimum value (ΣΔfm)min of the total sum of the back focus change ΣΔfm at each image height in the effective writing region with respect to the change in the environmental temperature satisfy a condition:

$|\{(\Sigma\Delta fm)\max-(\Sigma\Delta fm)\min\}/\Delta T|<0.02\ (mm/°C.)$.

40. A method of manufacturing an optical scanning device, comprising:

providing a photosensitive medium configured to be optically scanned; and providing an optical scanning device comprising a scanning imaging optical system, the scanning imaging optical system including, a first optical system configured to receive a light flux from a light source, a second optical system configured to receive the light flux from the first optical system and condense the light flux to form a long linear image in a main scanning direction in a vicinity of a deflecting surface of an optical deflector, and a third optical system including at least one resin imaging element, and configured to condense a light flux deflected by the optical deflector toward a scanned surface to form an optical beam spot on the scanned surface, wherein a maximum value ΔSmax and a minimum value ΔSmin of an amount of change ΔS in an image-surface curvature in a sub-scanning direction at each image height in an effective writing region with respect to a change ΔT in an environmental temperature satisfy a condition:

$|(\Delta S\max-\Delta S\min)/\Delta T|<0.01\ (mm/°C.)$, and wherein when an amount of a back focus change of each resin lens in the sub-scanning direction with respect to the chance ΔT in the environmental temperature is denoted by Δfs, and a total sum of the back focus change of the at least two resin imaging elements is denoted by ΣΔfs, a maximum value (ΣΔfs)max and a minimum value (ΣΔfs)min of the total sum of the back focus change ΣΔfs at each image height in the effective writing region with respect to the change in the environmental temperature satisfy a condition:

$|\{(\Sigma\Delta fs)\max-(\Sigma\Delta fs)\min\}/\Delta T|<0.02\ (mm/°C.)$.

41. A method of manufacturing an image forming apparatus, comprising:

providing a photosensitive medium configured to be optically scanned; and providing an optical scanning device comprising a scanning imaging optical system, the scanning imaging optical system including, a first optical system configured to receive a light flux from a light source, a second optical system configured to receive the light flux from the first optical system and condense the light flux to form a long linear image in a main scanning direction in a vicinity of a deflecting surface of an optical deflector, and a third optical system including at least one resin imaging element, and configured to condense a light flux deflected by the optical deflector toward a scanned surface to form an optical beam spot on the scanned surface, wherein a maximum value ΔMmax and a minimum value ΔMmin of an amount of change ΔM in an image-surface curvature in the main scanning direction at each image height in an effective writing region with respect to a change ΔT in an environmental temperature satisfy a condition:

$|(\Delta M\max-\Delta M\min)/\Delta T|<0.01\ (mm/°C.)$, and wherein when an amount of a back focus change of each resin lens in the main scanning direction with respect to the change ΔT in the environmental temperature is denoted by Δfm, and a total sum of the back focus change of the at least two resin imaging elements is denoted by ΣΔfm, a maximum value (ΣΔfm)max and a minimum value (ΣΔfm)min of the total sum of the back focus change ΣΔfm at each image height in the effective writing region with respect to the change in the environmental temperature satisfy a condition:

$|\{(\Sigma\Delta fm)\max-(\Sigma\Delta fm)\min\}/\Delta T|<0.02\ (mm/°C.)$.

42. A method of manufacturing an image forming apparatus, comprising:

providing a photosensitive medium configured to be optically scanned; and providing an optical scanning device comprising a scanning imaging optical system, the scanning imaging optical system including, a first optical system configured to receive a light flux from a light source, a second optical system configured to receive the light flux from the first optical system and condense the light flux to form a long linear image in a main scanning direction in a vicinity of a deflecting surface of an optical deflector, and a third optical system including at least one resin imaging element, and configured to condense a light flux deflected by the optical deflector toward a scanned surface to form an optical beam spot on the scanned surface, wherein a maximum value ΔSmax and a minimum value ΔSmin of an amount of change ΔS in an image-surface curvature in a sub-scanning direction at each image height in an effective writing region with respect to a change ΔT in an environmental temperature satisfy a condition:

$|(\Delta S\max-\Delta S\min)/\Delta T|<0.01\ (mm/°C.)$, and wherein when an amount of a back focus change of each resin lens in the sub-scanning direction with respect to the change ΔT in the environmental temperature is denoted by Δfs, and a total sum of the back focus change of the at least two resin imaging elements is denoted by ΣΔfs, a maximum value (ΣΔfs)max and a minimum value (ΣΔfs)min of the total sum of the back focus change ΣΔfs at each image height in the effective writing region with respect to the change in the environmental temperature satisfy a condition:

$|\{(\Sigma\Delta fs)\max-(\Sigma\Delta fs)\min\}/\Delta T|<0.02\ (mm/°C.)$.

* * * * *